(12) United States Patent
Kring et al.

(10) Patent No.: US 12,240,327 B2
(45) Date of Patent: Mar. 4, 2025

(54) COMPONENT FOR VEHICLE INTERIOR

(71) Applicant: Yanfeng International Automotive Technology Co., Ltd., Novi, MI (US)

(72) Inventors: Christopher Kring, Holland, MI (US); Dale Todd Glynn, Holland, MI (US); Scott Allen Hansen, Holland, MI (US)

(73) Assignee: Yanfeng International Automotive Technology Co., LTD., Novi, MI (US)

( * ) Notice: Subject to any disclaimer, the term of this patent is extended or adjusted under 35 U.S.C. 154(b) by 0 days.

(21) Appl. No.: 18/623,184

(22) Filed: Apr. 1, 2024

(65) Prior Publication Data
US 2024/0262198 A1 Aug. 8, 2024

Related U.S. Application Data

(63) Continuation of application No. PCT/US2023/081689, filed on Nov. 29, 2023.
(Continued)

(51) Int. Cl.
*B60K 35/10* (2024.01)
*B32B 3/30* (2006.01)
(Continued)

(52) U.S. Cl.
CPC .............. *B60K 35/50* (2024.01); *B32B 3/30* (2013.01); *B32B 27/08* (2013.01); *B60K 35/10* (2024.01);
(Continued)

(58) Field of Classification Search
CPC ........ B60K 35/10; B60K 35/22; B60K 35/25; B60K 2360/143; B60Q 3/14; B60Q 3/62;
(Continued)

(56) References Cited

U.S. PATENT DOCUMENTS 2,147,599 A 2/1939 Becker
3,876,977 A 4/1975 Ladewig
(Continued)

FOREIGN PATENT DOCUMENTS

CN 206383880 U 8/2017
CN 109278846 A 1/2019
(Continued)

OTHER PUBLICATIONS

International Search Report and Written Opinion received for PCT Application Serial No. PCT/US2021/027365 dated Jul. 19, 2021, 25 pages.
(Continued)

*Primary Examiner* — Deeprose Subedi
(74) *Attorney, Agent, or Firm* — Amin, Turocy & Watson, LLP

(57) ABSTRACT

A component for a vehicle interior may comprise a composite structure comprising a cover structure comprising a cover base, a cover layer and a cover surface; and a user interface system to present a user interface at the cover surface. The user interface system may comprise a light display and/or input device and/or actuator to provide feedback at the cover surface. The user interface may comprise the input device. The cover layer may cover at least a portion of the cover base. The cover base may comprise a core and a perimeter. The cover layer may be light-transmissive. The cover base may be opaque. The cover layer may form an illuminated border around the core. The cover layer may deform between the core and the perimeter. The cover structure may be integrally-formed. The cover layer may be molded on the cover base.

20 Claims, 25 Drawing Sheets

Related U.S. Application Data

(60) Provisional application No. 63/428,966, filed on Nov. 30, 2022.

(51) Int. Cl.
  *B32B 27/08* (2006.01)
  *B60K 35/22* (2024.01)
  *B60K 35/25* (2024.01)
  *B60K 35/50* (2024.01)
  *B60Q 3/14* (2017.01)
  *B60Q 3/62* (2017.01)
  *B60R 13/02* (2006.01)

(52) U.S. Cl.
  CPC ............ *B60K 35/22* (2024.01); *B60K 35/25* (2024.01); *B60Q 3/14* (2017.02); *B60Q 3/62* (2017.02); *B60R 13/02* (2013.01); *B32B 2307/41* (2013.01); *B32B 2457/208* (2013.01); *B32B 2605/003* (2013.01); *B60K 2360/143* (2024.01); *B60K 2360/693* (2024.01); *B60R 2013/0287* (2013.01)

(58) Field of Classification Search
  CPC ....... B32B 3/30; B32B 27/08; B32B 2307/41; B32B 2457/208; B32B 2605/003; B60R 13/02
  See application file for complete search history.

(56) References Cited

U.S. PATENT DOCUMENTS

| | | |
|---|---|---|
| 4,835,512 A | 5/1989 | Bratton |
| 5,062,604 A | 11/1991 | Monnier |
| 5,303,952 A | 4/1994 | Shermetaro et al. |
| 5,405,675 A | 4/1995 | Sawka et al. |
| 5,423,569 A | 6/1995 | Reighard et al. |
| 5,438,314 A | 8/1995 | Evans |
| 5,666,102 A | 9/1997 | Lahiff |
| 5,942,815 A | 8/1999 | Neuman et al. |
| 6,135,494 A | 10/2000 | Lotito et al. |
| 6,236,309 B1 | 5/2001 | Haag et al. |
| 6,296,380 B1 | 10/2001 | Dawli |
| 6,573,579 B1 | 6/2003 | Ho et al. |
| 6,635,838 B1 | 10/2003 | Kornelson |
| 7,100,959 B1 | 9/2006 | Herrera, Jr. |
| 8,093,520 B2 | 1/2012 | Bayley et al. |
| 8,094,127 B2 | 1/2012 | Young |
| 8,113,695 B2 | 2/2012 | Meinke et al. |
| 8,207,872 B2 | 6/2012 | Huang et al. |
| 8,317,247 B2 | 11/2012 | Beau et al. |
| 8,344,870 B2 | 1/2013 | Evans et al. |
| 8,376,596 B2 | 2/2013 | Beau et al. |
| 8,408,773 B2 | 4/2013 | Judge |
| 8,506,003 B2 | 8/2013 | Smith et al. |
| 8,596,803 B2 | 12/2013 | Schultz et al. |
| 8,641,251 B2 | 2/2014 | Oeuvrard et al. |
| 8,777,290 B1 | 7/2014 | Boese |
| 8,777,466 B2 | 7/2014 | Ouvrard et al. |
| 8,859,923 B2 | 10/2014 | Obata et al. |
| 8,909,419 B2 | 12/2014 | Park |
| 9,007,190 B2 | 4/2015 | Bosch et al. |
| 9,308,857 B2 | 4/2016 | Lisseman et al. |
| 9,308,930 B2 | 4/2016 | Bostick et al. |
| 9,513,707 B2 | 12/2016 | Lisseman et al. |
| 9,523,593 B2 | 12/2016 | Kunitachi et al. |
| 9,767,942 B2 | 9/2017 | Oeuvrard et al. |
| 9,815,406 B2 | 11/2017 | Lisseman et al. |
| 9,829,980 B2 | 11/2017 | Lisseman et al. |
| 9,898,087 B2 | 2/2018 | Lisseman et al. |
| 9,975,469 B2 | 5/2018 | Guerreiro |
| 10,007,342 B2 | 6/2018 | Lisseman et al. |
| 10,053,132 B2 | 8/2018 | Pitzer |
| 10,086,753 B2 | 10/2018 | Ebina |
| 10,112,533 B2 | 10/2018 | Yamato |
| 10,179,541 B2 | 1/2019 | Lisseman et al. |
| 10,180,723 B2 | 1/2019 | Lisseman et al. |
| 10,220,775 B2 | 3/2019 | Ebina |
| 10,241,579 B2 | 3/2019 | Lisseman et al. |
| 10,272,836 B2 | 4/2019 | Ali et al. |
| 10,414,439 B2 | 9/2019 | Spencer et al. |
| 10,464,476 B1 | 11/2019 | Mazuir et al. |
| 10,545,498 B2 | 1/2020 | Christiansen |
| 10,562,446 B2 | 2/2020 | Cannon |
| 10,569,703 B2 | 2/2020 | Kamei et al. |
| 10,638,618 B1 | 4/2020 | Teil et al. |
| 10,696,217 B2 | 6/2020 | Lisseman et al. |
| 10,696,218 B1 | 6/2020 | Kontani |
| 10,705,666 B2 | 7/2020 | Kring et al. |
| 10,780,909 B2 | 9/2020 | Aerts et al. |
| 10,821,889 B2 | 11/2020 | DeGrote et al. |
| 10,899,299 B1 | 1/2021 | Ali et al. |
| 11,061,475 B2 | 7/2021 | Galan Garcia et al. |
| 11,097,658 B1 | 8/2021 | Mazuir et al. |
| 11,104,229 B2 | 8/2021 | Galan Garcia et al. |
| 11,157,114 B1 | 10/2021 | Herman et al. |
| 11,225,191 B2 | 1/2022 | Ali et al. |
| 11,238,760 B2 | 2/2022 | Thompson |
| 11,325,290 B2 | 5/2022 | Stroebe et al. |
| 11,345,303 B2 | 5/2022 | Kring et al. |
| 11,383,639 B1 | 7/2022 | Kwon |
| 11,407,150 B2 | 8/2022 | Thielhorn et al. |
| 11,584,228 B2 | 2/2023 | Di Censo et al. |
| 11,628,780 B2 | 4/2023 | Kim et al. |
| 2002/0031620 A1 | 3/2002 | Yuzawa et al. |
| 2004/0250499 A1 | 12/2004 | Taemmerich |
| 2005/0021190 A1 | 1/2005 | Worrell et al. |
| 2005/0134559 A1 | 6/2005 | Hein et al. |
| 2005/0183897 A1 | 8/2005 | DePue |
| 2007/0062753 A1 | 3/2007 | Yoshida et al. |
| 2008/0143505 A1 | 6/2008 | Maruyama et al. |
| 2008/0157605 A1 | 7/2008 | Bowden et al. |
| 2008/0203755 A1 | 8/2008 | Bourgeois-Jacquet et al. |
| 2008/0211652 A1 | 9/2008 | Cope et al. |
| 2008/0253140 A1 | 10/2008 | Fleischmann et al. |
| 2009/0058118 A1 | 3/2009 | Hein et al. |
| 2009/0121459 A1 | 5/2009 | Bostick et al. |
| 2009/0189373 A1 | 7/2009 | Schramm et al. |
| 2009/0301852 A1 | 12/2009 | Keist et al. |
| 2010/0102538 A1 | 4/2010 | Paxton et al. |
| 2010/0154261 A1 | 6/2010 | Bozlo et al. |
| 2010/0250071 A1 | 9/2010 | Pala et al. |
| 2010/0268426 A1 | 10/2010 | Pathak et al. |
| 2010/0271329 A1 | 10/2010 | Oohira |
| 2011/0032715 A1 | 2/2011 | Beau et al. |
| 2011/0057465 A1 | 3/2011 | Beau et al. |
| 2011/0157906 A1 | 6/2011 | Oeuvrard et al. |
| 2011/0182081 A1 | 7/2011 | Oeuvrard et al. |
| 2012/0051067 A1 | 3/2012 | Murray |
| 2012/0074674 A1 | 3/2012 | Ohoka et al. |
| 2012/0074725 A1 | 3/2012 | Jeon |
| 2012/0106051 A1 | 5/2012 | Fluhrer |
| 2012/0146926 A1 | 6/2012 | An et al. |
| 2012/0188779 A1 | 7/2012 | Schultz et al. |
| 2012/0235935 A1 | 9/2012 | Ciesla et al. |
| 2012/0305377 A1 | 12/2012 | Hou |
| 2012/0313392 A1 | 12/2012 | Bingle |
| 2012/0320615 A1 | 12/2012 | Englert |
| 2013/0128587 A1 | 5/2013 | Lisseman et al. |
| 2013/0176335 A1 | 7/2013 | Sugiyama et al. |
| 2013/0319171 A1 | 12/2013 | Momen |
| 2013/0336004 A1 | 12/2013 | Mulder et al. |
| 2014/0008999 A1 | 1/2014 | Prest et al. |
| 2014/0098035 A1 | 4/2014 | Huang et al. |
| 2014/0136013 A1 | 5/2014 | Wolverton et al. |
| 2014/0145840 A1 | 5/2014 | Guerreiro |
| 2014/0210190 A1 | 7/2014 | Bosch et al. |
| 2014/0307179 A1 | 10/2014 | Zhao et al. |
| 2014/0376204 A1 | 12/2014 | Kunitachi et al. |
| 2015/0002404 A1 | 1/2015 | Hooton |
| 2015/0043193 A1 | 2/2015 | Chiba |
| 2015/0108742 A1 | 4/2015 | Bosch et al. |
| 2015/0199041 A1 | 7/2015 | Salter et al. |
| 2015/0219943 A1 | 8/2015 | Noh et al. |

(56) References Cited

U.S. PATENT DOCUMENTS

| | | |
|---|---|---|
| 2015/0274068 A1 | 10/2015 | Falconi |
| 2015/0279523 A1 | 10/2015 | Oeuvrard et al. |
| 2015/0291032 A1 | 10/2015 | Kim et al. |
| 2015/0294540 A1 | 10/2015 | Hori |
| 2015/0375678 A1 | 12/2015 | Salter et al. |
| 2016/0001807 A1 | 1/2016 | Hans et al. |
| 2016/0004362 A1 | 1/2016 | Kring et al. |
| 2016/0055991 A1 | 2/2016 | Kropf et al. |
| 2016/0103541 A1 | 4/2016 | Andrews et al. |
| 2016/0124623 A1 | 5/2016 | Chang |
| 2016/0144785 A1 | 5/2016 | Shimizu et al. |
| 2016/0160539 A1 | 6/2016 | Saitou et al. |
| 2016/0272111 A1 | 9/2016 | Teng et al. |
| 2016/0280128 A1 | 9/2016 | Cannon |
| 2016/0325674 A1 | 11/2016 | Krull et al. |
| 2017/0144593 A1 | 5/2017 | Gascón Rivera et al. |
| 2017/0151906 A1 | 6/2017 | Sakuma |
| 2017/0212633 A1 | 7/2017 | You et al. |
| 2017/0217366 A1 | 8/2017 | Kraemer et al. |
| 2017/0228126 A1 | 8/2017 | Kim et al. |
| 2017/0291493 A1 | 10/2017 | Bostick et al. |
| 2017/0311029 A1 | 10/2017 | Jung et al. |
| 2018/0015826 A1 | 1/2018 | Ahmad et al. |
| 2018/0018023 A1 | 1/2018 | Nakamura et al. |
| 2018/0065547 A1 | 3/2018 | Kirilenko et al. |
| 2018/0119922 A1 | 5/2018 | Yamaguchi et al. |
| 2018/0197460 A1 | 7/2018 | Johnson |
| 2018/0208105 A1 | 7/2018 | Salter et al. |
| 2018/0208111 A1 | 7/2018 | Lisseman et al. |
| 2018/0208212 A1 | 7/2018 | Suessenguth et al. |
| 2018/0251032 A1 | 9/2018 | Kang et al. |
| 2018/0339938 A1 | 11/2018 | Bellman et al. |
| 2019/0001870 A1 | 1/2019 | Laluet |
| 2019/0009716 A1 | 1/2019 | Scalea et al. |
| 2019/0056794 A1 | 2/2019 | Goldberg et al. |
| 2019/0063722 A1 | 2/2019 | Sugiyama et al. |
| 2019/0069403 A1 | 2/2019 | Heikkinen et al. |
| 2019/0077311 A1 | 3/2019 | Ali et al. |
| 2019/0077416 A1 | 3/2019 | Ueno et al. |
| 2019/0126853 A1 | 5/2019 | Cannon |
| 2019/0135199 A1* | 5/2019 | Galan Garcia ........ B60K 35/00 |
| 2019/0149607 A1 | 5/2019 | Shim et al. |
| 2019/0202290 A1 | 7/2019 | Havemann |
| 2019/0210519 A1 | 7/2019 | Kim et al. |
| 2019/0210520 A1 | 7/2019 | Marc et al. |
| 2019/0218836 A1 | 7/2019 | Trabucco |
| 2019/0227308 A1 | 7/2019 | Yokoe et al. |
| 2019/0248284 A1 | 8/2019 | Ali et al. |
| 2019/0267996 A1 | 8/2019 | Kontani |
| 2019/0275932 A1 | 9/2019 | Cho et al. |
| 2019/0275935 A1 | 9/2019 | Lisseman et al. |
| 2019/0283690 A1 | 9/2019 | Hansen et al. |
| 2019/0285878 A1 | 9/2019 | Hansen et al. |
| 2019/0310099 A1 | 10/2019 | Lefringhausen et al. |
| 2019/0326908 A1 | 10/2019 | Salter et al. |
| 2019/0337566 A1 | 11/2019 | Weidig |
| 2019/0344689 A1 | 11/2019 | Bailey |
| 2020/0001782 A1 | 1/2020 | Kamei et al. |
| 2020/0016807 A1 | 1/2020 | Hairer et al. |
| 2020/0039559 A1 | 2/2020 | Aerts et al. |
| 2020/0079312 A1 | 3/2020 | Stroebe et al. |
| 2020/0083886 A1 | 3/2020 | Vemulapati et al. |
| 2020/0089226 A1 | 3/2020 | Breisinger et al. |
| 2020/0108768 A1 | 4/2020 | Ali et al. |
| 2020/0122672 A1 | 4/2020 | Murai et al. |
| 2020/0139814 A1 | 5/2020 | Galan Garcia et al. |
| 2020/0139883 A1 | 5/2020 | Brown |
| 2020/0164795 A1 | 5/2020 | DeGrote et al. |
| 2020/0198535 A1 | 6/2020 | Kontani |
| 2020/0210003 A1 | 7/2020 | Hong et al. |
| 2020/0217477 A1 | 7/2020 | Nicholson et al. |
| 2020/0238824 A1 | 7/2020 | Park |
| 2020/0249779 A1 | 8/2020 | Salandre et al. |
| 2020/0273429 A1 | 8/2020 | Broy et al. |
| 2020/0278715 A1 | 9/2020 | Caruso et al. |
| 2020/0369007 A1 | 11/2020 | Bauerle et al. |
| 2021/0023586 A1 | 1/2021 | Kondou |
| 2021/0070014 A1 | 3/2021 | Sun et al. |
| 2021/0086617 A1 | 3/2021 | Jeon |
| 2021/0159032 A1 | 5/2021 | Kuo et al. |
| 2021/0188091 A1 | 6/2021 | Whitehead et al. |
| 2021/0201355 A1 | 7/2021 | van den Berg et al. |
| 2021/0268907 A1 | 9/2021 | Zimmermann et al. |
| 2021/0284063 A1 | 9/2021 | Wang |
| 2021/0284078 A1 | 9/2021 | Hinchman et al. |
| 2021/0309106 A1 | 10/2021 | Bachmeier et al. |
| 2021/0323270 A1 | 10/2021 | Weikel et al. |
| 2021/0323467 A1 | 10/2021 | Richardson et al. |
| 2021/0331732 A1 | 10/2021 | Justinger |
| 2021/0347260 A1 | 11/2021 | Lambricht et al. |
| 2021/0362594 A1 | 11/2021 | Mohana et al. |
| 2021/0370824 A1 | 12/2021 | Mazuir et al. |
| 2021/0380034 A1 | 12/2021 | Kleo et al. |
| 2022/0001827 A1 | 1/2022 | Kring et al. |
| 2022/0024378 A1 | 1/2022 | Yang et al. |
| 2022/0139647 A1 | 5/2022 | Mizuno |
| 2022/0212541 A1 | 7/2022 | Kring et al. |
| 2022/0238497 A1 | 7/2022 | Brandl et al. |
| 2022/0306189 A1 | 9/2022 | Ojima et al. |
| 2022/0348082 A1 | 11/2022 | Piccin et al. |
| 2022/0363190 A1 | 11/2022 | Vanluchene et al. |
| 2022/0365386 A1 | 11/2022 | Cuvillier |
| 2023/0028841 A1 | 1/2023 | Groene et al. |
| 2023/0052099 A1 | 2/2023 | Buchet et al. |
| 2023/0152897 A1 | 5/2023 | Abe et al. |
| 2023/0192010 A1 | 6/2023 | Erler |
| 2023/0211727 A1 | 7/2023 | Kring et al. |
| 2023/0249616 A1 | 8/2023 | Goeritz-Stamencic et al. |
| 2023/0271549 A1 | 8/2023 | Zhang et al. |
| 2023/0278490 A1 | 9/2023 | Lange-Mao et al. |
| 2023/0311804 A1 | 10/2023 | Glynn et al. |
| 2023/0344381 A1 | 10/2023 | Maimon et al. |

FOREIGN PATENT DOCUMENTS

| | | |
|---|---|---|
| CN | 109703453 A | 5/2019 |
| CN | 109720271 A | 5/2019 |
| CN | 209581302 U | 11/2019 |
| CN | 110539691 A | 12/2019 |
| CN | 113276326 A | 8/2021 |
| DE | 103 46 691 B4 | 2/2013 |
| DE | 10 2016 116 595 A1 | 3/2017 |
| DE | 10 2016 116 596 A1 | 3/2017 |
| DE | 10 2017 217 916 A1 | 4/2019 |
| DE | 10 2018 200 591 A1 | 7/2019 |
| DE | 20 2019 005 292 U1 | 2/2020 |
| EP | 2 236 342 A1 | 10/2010 |
| EP | 2 318 235 B1 | 2/2012 |
| EP | 2 318 236 A1 | 2/2012 |
| EP | 2 426 012 A1 | 3/2012 |
| EP | 2 268 499 B1 | 9/2013 |
| EP | 2 841 302 A1 | 3/2015 |
| EP | 2 834 130 B1 | 7/2018 |
| EP | 2 271 518 B1 | 9/2018 |
| EP | 3 124 352 B1 | 9/2018 |
| EP | 3 127 776 B1 | 12/2018 |
| EP | 3 180 225 B1 | 3/2019 |
| EP | 2 731 817 B1 | 5/2019 |
| FR | 2 824 510 B1 | 8/2003 |
| FR | 2 911 555 B1 | 4/2009 |
| FR | 2 917 350 B1 | 12/2009 |
| FR | 2 920 119 B1 | 2/2010 |
| FR | 2 920 120 B1 | 3/2010 |
| FR | 2 930 918 B1 | 6/2010 |
| FR | 2 937 928 B1 | 12/2010 |
| FR | 2 937 929 B1 | 1/2011 |
| FR | 2 937 604 B1 | 3/2011 |
| FR | 3 056 767 B1 | 7/2019 |
| WO | 2009/151253 A3 | 3/2010 |
| WO | 2013/160588 A1 | 10/2013 |
| WO | 2018/005197 A1 | 1/2018 |
| WO | 2018/013557 A1 | 1/2018 |
| WO | 2019/233983 A1 | 12/2019 |

(56) References Cited

FOREIGN PATENT DOCUMENTS

| WO | 2020/028625 A1 | 2/2020 |
| WO | 2021/211768 A1 | 10/2021 |
| WO | 2023/215624 A1 | 11/2023 |

OTHER PUBLICATIONS

Non-Final Office Action received for U.S. Appl. No. 17/481,022 dated Jan. 3, 2022, 45 pages.
Notice of Allowance received for U.S. Appl. No. 17/481,022 dated Apr. 14, 2022, 25 pages.
Non-Final Office Action received for U.S. Appl. No. 17/704,279 dated Aug. 16, 2022, 61 pages.
Final Office Action received for U.S. Appl. No. 17/704,279 dated Nov. 30, 2022, 46 pages.
Notice of Allowance received for U.S. Appl. No. 17/704,279 dated Mar. 16, 2023, 53 pages.
Non-Final Office Action received for U.S. Appl. No. 17/966,052 dated Jun. 8, 2023, 320 pages.
Notice of Allowance received for U.S. Appl. No. 17/966,052 dated Jul. 31, 2023, 113 pages.
Innovation Q+, NPL Search, Jul. 20, 2023, 18 pages.
International Search Report and Written Opinion received for PCT Application Serial No. PCT/US2023/021270 dated Sep. 19, 2023, 22 pages.
Notice of Allowance received for U.S. Appl. No. 18/134,789 dated Nov. 13, 2023, 50 pages.

\* cited by examiner

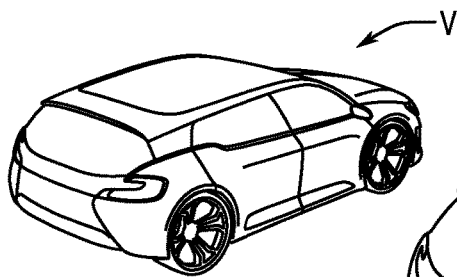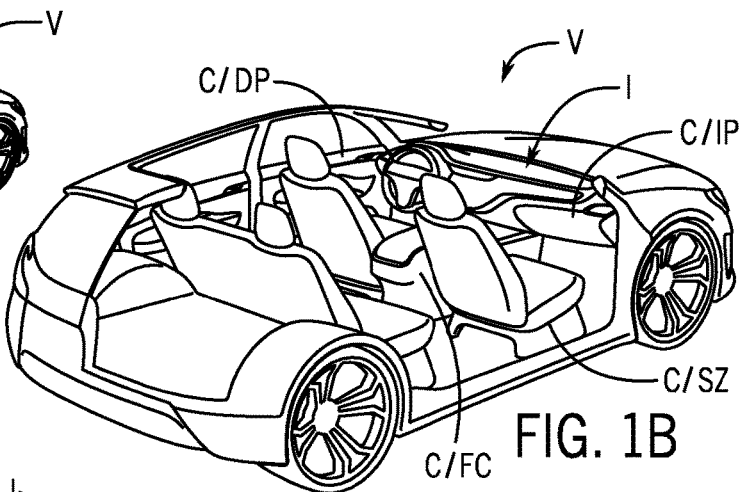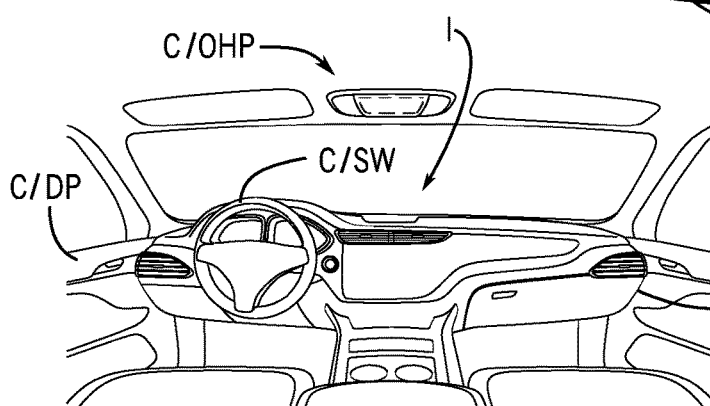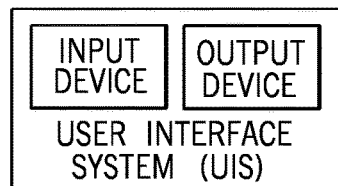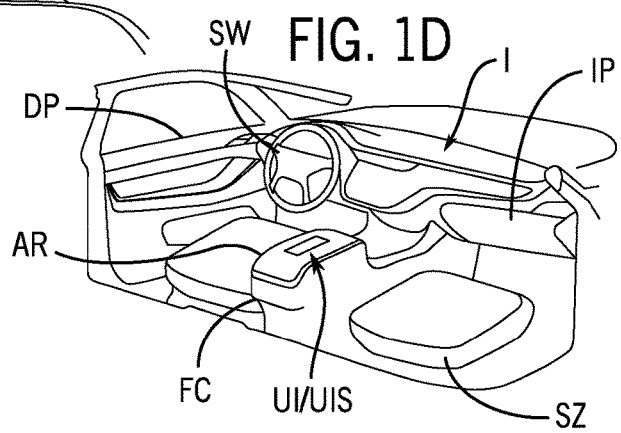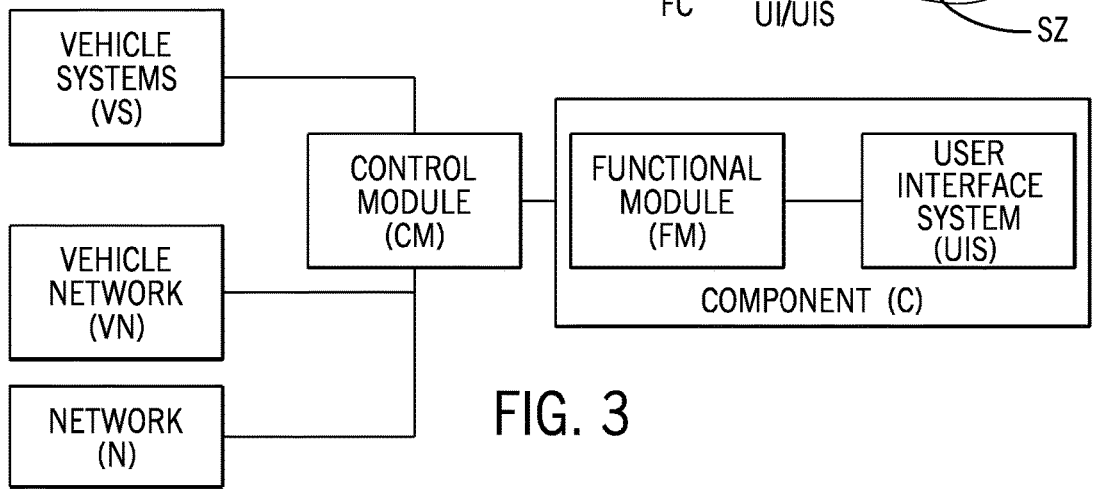

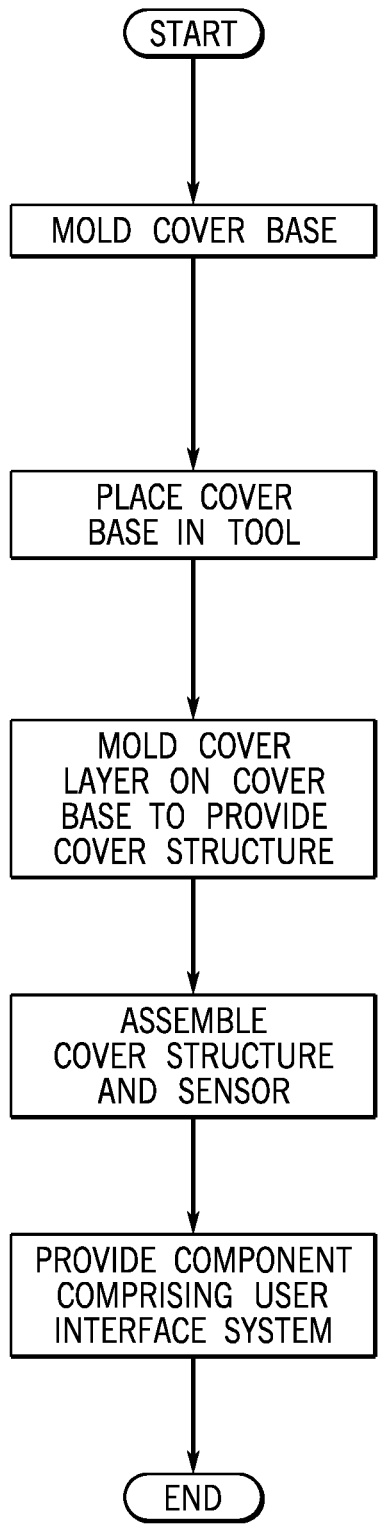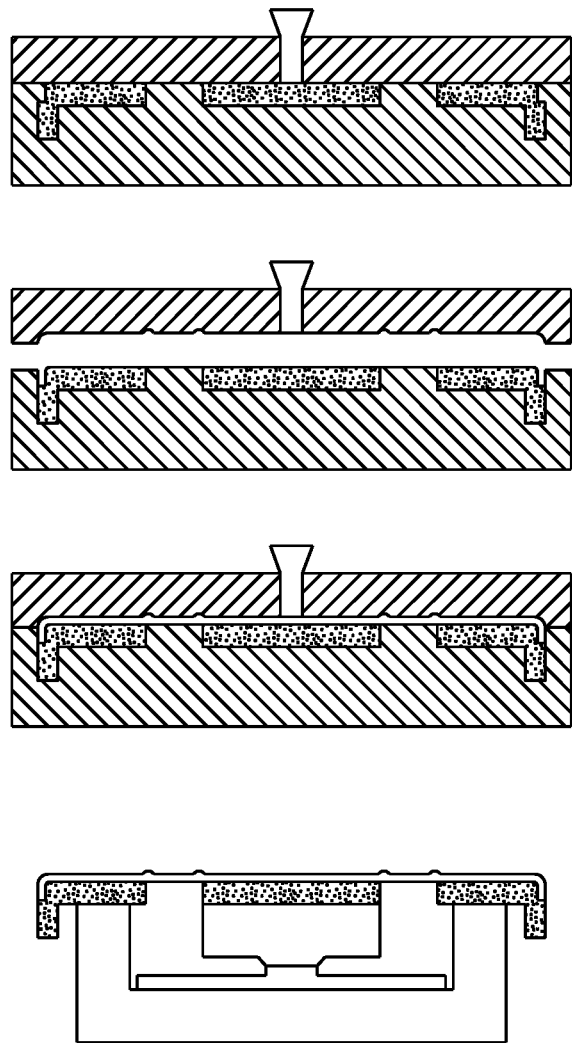
FIG. 40

COMPONENT FOR VEHICLE INTERIOR

CROSS-REFERENCE TO RELATED APPLICATIONS

The present application is a continuation of PCT/International Patent Application No. PCT/US2023/81689 titled "COMPONENT FOR VEHICLE INTERIOR" filed Nov. 29, 2023, which claims the benefit of U.S. Provisional Patent Application No. 63/428,966 titled "COMPONENT FOR VEHICLE INTERIOR" filed Nov. 30, 2022.

The present application claims priority to and incorporates by reference in full the following patent applications: (a) U.S. Provisional Patent Application No. 63/428,966 titled "COMPONENT FOR VEHICLE INTERIOR" filed Nov. 30, 2022; (b) PCT/International Patent Application No. PCT/US2023/81689 titled "COMPONENT FOR VEHICLE INTERIOR" filed Nov. 29, 2023.

FIELD

The present invention relates to a component for a vehicle interior.

The present invention also relates to a component for a vehicle interior configured to present a user interface.

BACKGROUND

It is known to provide a component for a vehicle interior providing a user interface.

It would be advantageous to provide an improved component with a cover and comprising a user interface system configured to provide an input device and/or an output device presenting a user interface for a vehicle occupant.

SUMMARY

The present invention relates to a component for a vehicle interior configured to present a user interface comprising a composite structure comprising a cover structure comprising a cover base, a cover layer and a cover surface; and a user interface system configured to present the user interface at the cover surface comprising (a) a light display configured to transmit light from a light source and (b) an input device. The cover structure may be configured to provide the user interface. The user interface may comprise the input device. The cover layer may be configured to cover at least a portion of the cover base. The cover base may comprise a core and a perimeter. The cover layer may comprise a light-transmissive material. The cover base may comprise an opaque material. The cover layer may be configured to transmit light from the light source between the core of the cover base and the perimeter of the cover base. The cover layer may be configured to form an illuminated border around the core of the cover base. The cover layer may be configured to deform between the core of the cover base and the perimeter of the cover base. The cover structure may comprise an integrally-formed structure.

The present invention relates to a component for a vehicle interior configured to present a user interface comprising a composite structure comprising a cover structure comprising a cover base, a cover layer and a cover surface; and a user interface system configured to present the user interface at the cover surface comprising (a) an actuator configured to provide feedback at the cover surface and (b) an input device. The cover structure may be configured to provide the user interface. The user interface may comprise the input device. The cover layer may be configured to cover at least a portion of the cover base. The cover base may comprise a core and a perimeter. The actuator may be configured to deform the cover layer between the core of the cover base and the perimeter of the cover base. The user interface system may comprise a light display configured to transmit light from a light source. The cover layer may provide the cover surface; the cover layer may comprise at least one of (a) a raised feature; (b) a depression; (c) an icon. The cover structure may comprise an integrally-formed structure.

The present invention relates to a component for a vehicle interior configured to present a user interface comprising a composite structure comprising a cover structure comprising a cover base, a cover layer and a cover surface; and a user interface system configured to present the user interface at the cover surface comprising (a) an actuator configured to provide feedback at the cover surface and (b) an input device. The cover structure may be configured to provide the user interface. The user interface may comprise the input device. The cover layer may be configured to cover at least a portion of the cover base. The cover base may comprise a core and a perimeter. The cover layer may be configured to transmit light from a light source between the core of the cover base and the perimeter of the cover base. The cover layer may comprise a projection configured to fit within a recess in the cover base. The cover layer may comprise a feature; the feature may be configured to provide the input device for the user interface. The cover layer may be molded on the cover base.

The present invention relates to a component for a vehicle interior configured to present a user interface comprising a composite structure comprising a cover structure comprising a cover base, a cover layer and a cover surface; a user interface system configured to present the user interface at the cover surface comprising (a) an actuator configured to provide feedback at the cover surface and (b) an input device; and a light guide. The cover structure may be configured to provide the user interface. The user interface may comprise the input device. The cover layer may be configured to cover at least a portion of the cover base. The cover base may comprise a core and a perimeter. The light guide may be configured to transmit light from a light source to the core of the cover base. The light guide may be configured to transmit at least one of (a) a force from the actuator to the cover surface; (b) vibration from the actuator to the cover surface; and/or (c) motion from the actuator to the cover surface. The component may comprise a sensor between the light guide and the core of the cover base. The sensor may comprise at least one of (a) a capacitive sensor; (b) a touch sensor. The actuator may be coupled to the core of the cover base.

The present invention relates to a component for a vehicle interior configured to present a user interface comprising a composite structure comprising a cover structure comprising a cover base, a cover layer and a cover surface; and a user interface system for the cover structure configured to present the user interface. The cover structure may be configured to provide the user interface. The user interface may comprise an input device. The cover layer may be configured to cover at least a portion of the cover base. The cover base may comprise a core and a perimeter. The user interface system may comprise an output device comprising a haptics system comprising a transducer and an actuator; the user interface system may be actuated by the input device. The output device may comprise a light display; the light display may be configured to present at least one of (a) an image; (b) an icon. The cover layer may provide the cover surface; the cover layer may comprise at least one of (a) a raised feature; (b) a depression; (c) an icon. The cover layer may comprise a feature; the feature may be configured to provide a decorative effect at the cover structure; the decorative effect may comprise the user interface.

The present invention relates to a component for a vehicle interior configured to present a user interface comprising a composite structure comprising a cover structure comprising a cover base, a cover layer and a cover surface. The cover structure may be configured to provide the user interface. The user interface may comprise an input device. The cover layer may be configured to cover at least a portion of the cover base. The cover base may comprise a core and a perimeter surrounding the core. The cover layer may extend into the cover base between the core of the cover base and the perimeter of the cover base. The cover layer may be configured to facilitate movement of the core of the cover base relative to the perimeter of the cover base. The component may comprise a gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer may extend into the aperture between the core of the cover base and the perimeter of the cover base. The cover base may comprise an aperture; the cover layer may fill the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depression; (c) an icon. The cover layer may be configured to deform as the input device is pressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. Material of the decorative layer may comprise a color different than a color of material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depression; (c) an icon. The decorative layer may be laminated on the cover layer. The decorative layer may comprise at least one of (a) a paint material; (b) an ink material. The decorative layer may comprise a depression formed by removal of a portion of the at least one of (a) the paint material; (b) the ink material. The decorative layer may comprise an opaque material; the cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The component may comprise a sensor between the light guide and the core of the cover base. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; (c) motion at the cover surface. The actuator may be coupled to the core of the cover base. The actuator may be configured to deform the cover layer between the core of the cover base and the perimeter of the cover base. The cover structure may comprise a decorative layer on the cover layer; the decorative layer may comprise an aperture configured to transmit light from the light source to present a light display. The cover layer may be configured to transmit light from a light source between the core of the cover base and the perimeter of the cover base. The input device may comprise a light guide between a light source and the core of the cover base. The component may comprise a light guide configured to transmit light from a light source to the core of the cover base. The light guide may be configured to transmit at least one of (a) a force from the actuator to the cover surface; (b) vibration from the actuator to the cover surface; (c) motion from the actuator to the cover surface. The component may comprise a sensor between the light guide and the core of the cover base. The cover structure may be configured to facilitate deployment of an airbag into the vehicle interior. The cover base may comprise a recess formed as an indentation in a rear side of the cover base; the recess may be configured to direct deployment of the airbag through the cover structure. The input device may comprise a light guide configured to transmit light from a light source to the core of the cover base. The input device may comprise at least one of a sensor and/or a switch. The input device may comprise a sensor; the sensor may comprise at least one of (a) a detector; (b) a capacitive sensor; (c) a touch sensor; (d) a mechanical switch. The input device may comprise an operator control for at least one vehicle system. The user interface may comprise the input device and an output device. The output device may comprise at least one of a light display and/or a haptics transducer. The output device may comprise a light display; the light display may comprise at least one of (a) a panel; (b) a display panel; (c) a button panel; (d) lighting; (e) a light guide; (f) LED lighting. The output device may comprise a light display; the light display may be configured to present at least one of (a) an image; (b) an icon. The light display may be configured to present a decorative effect; the decorative effect may comprise an illuminated state. The component may comprise a user interface system for the cover structure configured to present the user interface. The user interface system may comprise at least one of (a) a haptics system; (b) a haptics system comprising a transducer; (c) a haptics system comprising a transducer and an actuator; (d) an output device comprising a haptics system; (e) an output device comprising a lighted panel. The user interface system may comprise an output device comprising a haptics system comprising a transducer and an actuator; the user interface system may be actuated by the input device. The component may comprise an assembly comprising the composite structure and a functional module; the functional module may be configured to operate at least one of (a) a sensor or (b) a switch or (c) a detector or (d) a light display or (e) a display panel or (f) a control panel or (g) a transducer or (h) a haptics actuator or (i) a haptics transducer. The composite structure may comprise a base; the base may comprise a functional module; the functional module may be configured to present the user interface. The cover structure may comprise at least one of (a) an integrally-formed structure; (b) an integrally-molded structure; (c) a molded structure; (d) a molded resin structure; (e) a resin structure; (f) a cover layer; (g) a single-layer cover. The cover layer may comprise a resin structure. The cover layer may comprise a feature. The feature may comprise at least one of (a) a projection; (b) a projection at a surface of the cover layer; (c) a projection below the cover layer; (d) a rib; (e) a set of ribs; (f) an aperture; (g) an indentation; (h) an indentation and a projection; (i) a projection configured to fit within a recess in the cover base. The feature may be configured to provide the input device for the user interface. The feature may be configured to provide a decorative effect at the cover structure; the decorative effect may comprise the user interface. The cover structure may comprise a decorative layer configured to provide a decorative effect at a surface. The decorative effect may comprise at least one of (a) an image; (b) an icon. The decorative effect may comprise a set of indicators for the input device. The cover layer may comprise a panel presenting the user interface. The cover layer may comprise a panel comprising the input device and an output device. The cover layer may comprise at least one of (a) a flexible structure; (b) a deformable structure. The cover structure of the composite structure may comprise a recess configured to facilitate formation of an airbag door in the cover structure during deployment of an airbag. The input device may comprise an operator control for at least one vehicle system; the at least one vehicle system may comprise at least one of (a) a vehicle communication system; (b) vehicle entry locks; (c) an HVAC system; (d) an occupant comfort system; (e) an occupant safety system; (f) vehicle lighting; (g) a vehicle entertainment system; (h) a vehicle audio system; (i) vehicle instrumentation; (j) vehicle status information; (k) vehicle operation system; (l) mobile device connectivity; (m) network connectivity. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit; (k) a trim panel, (l) an overhead console; (m) an overhead system; (n) an operator control.

The present invention relates to a component for a vehicle interior configured to provide a user interface for interaction with a vehicle occupant in a vehicle providing at least one vehicle system comprising (a) a cover structure comprising a cover surface; and (b) an input device. The cover structure may comprise a composite cover comprising a cover layer and a cover base. The cover layer may be configured to cover at least a portion of the cover base. The cover base may comprise a core and a perimeter surrounding the core. The input device may comprise the core of the cover base.

The present invention relates to a component for a vehicle interior configured to present a user interface comprising a composite structure comprising a cover structure comprising a cover base and a cover layer. The cover structure may be configured to provide the user interface. The user interface may comprise an input device. The cover structure may comprise the cover base and the cover layer and a cover surface. The cover layer may be configured to cover at least a portion of the cover base. The cover base may comprise a core and a perimeter surrounding the core. The cover layer extends into the cover base between the core of the cover base and the perimeter of the cover base. The cover layer may be configured to facilitate movement of the core of the cover base relative to the perimeter of the cover base. The component may comprise an air gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer extends into the aperture between the core of the cover base and the perimeter of the cover base. The cover base may comprise an aperture; the cover layer fills the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depression; (c) an icon. The cover layer may be configured to deform as the input device is depressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. The aperture may comprise at least one of (a) a depression; (b) an icon. The decorative layer may comprise a material different than a material of the cover layer. The material of the decorative layer may comprise a color different than a color of the material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depression; (c) an icon. The decorative layer may comprise a laminate. The decorative layer may be laminated on the cover layer. The decorative layer may comprise at least one of (a) a paint material; (b) an ink material. The decorative layer may comprise a depression formed by removal of a portion of the at least one of (a) the paint material; (b) the ink material. The decorative layer may comprise an opaque material. The cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The aperture may comprise at least one of (a) a depressed feature; (b) an icon. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The light guide may be configured to transmit light from the light source to the core of the cover base. The component may comprise a sensor between the light guide and the core of the cover base. The sensor may comprise at least one of (a) a capacitive touch sensor; (b) a capacitive touch film. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; and/or (c) motion at the cover surface. The cover layer may be configured to facilitate vibration of the core of the cover base. The actuator may be coupled to the core of the cover base. The actuator may be configured to deform the cover layer between the core of the cover base and the perimeter of the cover base. The user interface system may comprise a light display configured to transmit light from a light source. The cover structure may comprise a decorative layer on the cover layer; the decorative layer may comprise an aperture configured to transmit light from the light source to present the light display. The cover structure may comprise a decorative layer on the cover layer; the decorative layer may be configured to present an icon illuminated by the light source. The cover layer may be configured to transmit light from the light source between the core of the cover base and the perimeter of the cover base. The input device may comprise a light guide between the light source and the core of the cover base. The light guide may be configured to transmit light from the light source to the core of the cover base. The light guide may be coupled to the actuator. The light guide may be configured to transmit at least one of (a) a force from the actuator to the cover surface; (b) vibration from the actuator to the cover surface; and/or (c) motion from the actuator to the cover surface. The component may comprise a sensor between the light guide and the core of the cover base. The sensor may comprise at least one of (a) a capacitive touch sensor; (b) a capacitive touch film. The cover structure may be configured to facilitate deployment of an airbag into the vehicle interior. The cover base and the cover layer may be configured to break apart to facilitate deployment of the airbag into the vehicle interior. The cover base may comprise a recess formed as an indentation in the rear side of the cover base; the recess may be configured to direct deployment of the airbag through the cover structure. The cover layer may be configured to prevent visibility of the recess in the cover base. The cover structure may comprise a decorative layer on the cover layer; the decorative layer may be configured to prevent visibility of the recess in the cover base. The cover base may comprise a through hole configured to direct deployment of the airbag through the cover structure; the cover layer may be molded in the through hole. The input device may comprise a light guide configured to transmit light from a light source to the core of the cover base. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit. The user interface may comprise the input device and an output device. The input device may comprise at least one of a sensor and/or a switch. The sensor may comprise a detector. The sensor may comprise a capacitive sensor. The sensor may comprise a touch sensor. The switch may comprise a mechanical switch. The input device may comprise an operator control for at least one vehicle system. The output device may comprise at least one of a light display and/or a haptics transducer. The light display may comprise a panel. The light display may comprise a display panel. The light display may comprise a button panel. The light display may comprise lighting. Lighting may comprise LED lighting. The light display may comprise a light guide. The light display may comprise the light guide and LED lighting. The light display may be configured to present an image. The light display may be configured to present an image; the icon may comprise a set of icons. The light display may be configured to present an icon. The light display may be configured to present an icon; the icon may comprise a set of icons. The light display may be configured to present a decorative effect. The decorative effect may comprise an illuminated state and an unilluminated state. The illuminated state may comprise a set of icons. The haptics transducer may comprise a vibrating transducer. The haptics transducer may be configured to provide a tactile vibration. The component may comprise a user interface system for the cover structure configured to present the user interface. The component may comprise a functional module. The component may comprise an assembly comprising the composite structure and a functional module. The functional module may be configured to operate at least one of (a) a sensor or (b) a switch or (c) a detector or (d) a light display or (e) a display panel or (f) a control panel or (g) a transducer or (h) a haptics actuator or (i) a haptics transducer. The user interface system may be configured to provide the user interface with the functional module. The user interface system may comprise an interface with the functional module. The functional module may be coupled to vehicle systems. The functional module may be coupled to a network. The network may comprise a vehicle network. The network may comprise the internet. The network may comprise a communications network configured to provide data for the user interface. The functional module may be operated by a control module. The functional module may comprise a control module. The user interface system may comprise a haptics system. The user interface system may comprise a haptics system comprising a transducer. The user interface system may comprise a haptics system comprising a transducer and an actuator. The user interface system may comprise a haptics system comprising a transducer and an actuator; the user interface system may be actuated by the input device. The user interface system may comprise an output device comprising a haptics system. The user interface system may comprise an output device comprising a haptics system for the user interface. The user interface system may comprise an output device comprising a haptics system comprising a transducer and an actuator; the user interface system may be actuated by the input device. The user interface system may comprise an output device comprising a lighted panel. The user interface system may comprise an output device comprising a lighted panel for the user interface. The composite structure may comprise a base. The composite structure may comprise a substrate. The composite structure may comprise a panel. The cover structure may comprise a cover panel. The composite structure may comprise a base; the base may comprise a functional module; the functional module may be configured to present the user interface. The composite structure may comprise a base; the base may comprise a user interface system; the user interface system may comprise a functional module; the functional module may be configured to present the user interface. The cover structure may comprise an integrally-formed structure. The cover structure may comprise an integrally-molded structure. The cover structure may comprise a molded structure. The cover structure may comprise a molded resin structure. The cover structure may comprise a resin structure. The cover structure may comprise a cover layer. The cover structure may comprise a single-layer cover. The cover layer may comprise a resin structure. The cover structure may comprise a base structure comprising the cover base. The cover base may comprise an aperture. The cover layer may be configured to present the user interface. The cover layer may be configured to present a decorative effect. The cover layer may be configured to present a decorative effect and the user interface. The cover layer may comprise a feature. The feature may comprise a projection. The feature may comprise a projection at a surface of the cover layer. The feature may comprise a projection below the cover layer. The feature may comprise a rib. The feature may comprise a set of ribs. The feature may comprise an aperture. The feature may comprise an indentation. The feature may comprise an indentation and a projection. The feature may comprise a projection configured to fit within a recess in the cover base. The feature may be configured to provide the input device for the user interface. The feature may be configured to provide a decorative effect at the cover structure. The decorative effect of the input device may comprise the user interface. The cover structure may comprise a decorative layer. The cover structure may comprise a decorative layer on the cover layer. The cover structure may comprise a decorative layer configured to provide a decorative effect at a surface. The decorative effect may comprise an image. The decorative effect may comprise an icon. The decorative effect may comprise a set of icon. The decorative effect may comprise a set of indicators. The decorative effect may comprise a set of indicators for the input device. The decorative effect may comprise a set of indicators for a touch panel for the input device. The decorative effect may comprise a set of buttons for the input device. The cover layer may comprise a panel. The cover layer may comprise a panel within an aperture in the cover base. The cover layer may comprise a panel connected to the cover base. The cover layer may comprise a panel presenting the user interface. The cover layer may comprise a panel comprising the input device. The cover layer may comprise a panel comprising the input device comprising a touch panel. The cover layer may comprise a panel comprising the input device and an output device. The cover layer may comprise a flexible panel comprising the input device. The cover layer may comprise a flexible structure. The cover layer may comprise a deformable structure. The cover layer may comprise a deformable panel comprising the input device. The cover base may comprise a functional module for the user interface system. The cover base may comprise a sensor. The cover base may comprise a sensor element. The cover base may comprise a lighting system. The cover base may comprise a lighting system comprising a light guide and an LED system. The cover layer may comprise a light-transmissive material. The cover layer may comprise a light-transmissive material and an opaque material. The cover layer may comprise a light-transmissive material and an opaque material configured to provide an illumination effect. The composite structure may comprise a decorative layer; the cover layer may comprise a light-transmissive material and an opaque material configured to provide an illumination effect. The composite structure may be configured to provide a visual effect. The visual effect may comprise a decorative effect of the decorative layer. The visual effect may comprise the illumination effect. The visual effect may comprise a decorative effect of the decorative layer and the illumination effect. The composite structure may comprise a panel. The composite structure may comprise a fiber panel. The composite structure may be configured to facilitate deployment of an airbag. The composite structure may be configured to facilitate deployment of an airbag from an airbag module. The composite structure may be configured to facilitate deployment of an airbag through an airbag door formed in the cover structure. The composite structure may be configured to facilitate formation of an airbag door in the cover structure during deployment of an airbag. The composite structure may be configured to facilitate formation of an airbag door in the cover structure during deployment of an airbag from an airbag module. The cover structure of the composite structure may comprise a recess configured to facilitate formation of an airbag door in the cover structure during deployment of an airbag from an airbag module. The input device may comprise an operator control for at least one vehicle system; the vehicle system may comprise at least one of a vehicle communication system, vehicle entry locks, an HVAC system, an occupant comfort system, an occupant safety system, vehicle lighting, a vehicle entertainment system, a vehicle audio system, vehicle instrumentation, vehicle status information, vehicle operation system, mobile device connectivity, network connectivity. The component may comprise at least one of a trim panel, an instrument panel, a door panel, a console, a floor console, an overhead console, an overhead system, an operator control, a steering wheel. The cover structure may comprise a cover surface and the input device may comprise a button. The cover structure may comprise a composite cover comprising the cover layer and the cover base. The cover layer may be configured to cover at least a portion of the cover base. The cover base may comprise a core and a perimeter surrounding the core. The input device may comprise the core of the cover base. The cover structure may comprise a cover surface. The cover structure may comprise a composite cover comprising the cover layer and the cover base. The cover layer may be configured to cover at least a portion of the cover base. The cover base may comprise a core and a perimeter surrounding the core. The input device may comprise the core of the cover base.

The present invention relates to a component for a vehicle interior configured to provide a user interface for interaction with a vehicle occupant in a vehicle providing at least one vehicle system comprising (a) a cover structure comprising a cover surface; and (b) an input device comprising a button. The cover structure may comprise a composite cover comprising a cover layer and a cover base. The cover layer may be configured to cover at least a portion of the cover base. The cover base may comprise a core and a perimeter surrounding the core. The input device may comprise the core of the cover base.

The present invention relates to a component for a vehicle interior configured to provide a user interface for interaction with a vehicle occupant in a vehicle providing at least one vehicle system comprising (a) a cover structure comprising a cover surface; and (b) an input device comprising a button. The cover structure may comprise a composite cover comprising a cover layer and a cover base. The cover layer may be configured to cover at least a portion of the cover base. The cover base may comprise a core and a perimeter surrounding the core. The input device may comprise the core of the cover base. The cover layer may extend into the cover base between the core of the cover base and the perimeter of the cover base. The cover layer may be configured to facilitate movement of the core of the cover base relative to the perimeter of the cover base. The component may comprise an air gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer may extend into the aperture between the core of the cover base and the perimeter of the cover base. The cover base may comprise an aperture; the cover layer may fill the aperture between the core of the cover base and the perimeter of the cover base. The cover layer may comprise a first material and the cover base may comprise a second material different than the first material; the first material maybe softer than the second material. The cover layer may provide the cover surface; the cover layer may comprise a projection configured to present the input device at the cover surface. The cover layer may provide the cover surface; the cover layer may comprise at least one of (a) a raised feature; (b) a depressed feature; (c) an icon. The cover layer may be configured to deform as the button is depressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. The aperture may comprise at least one of (a) a depressed feature; (b) an icon. The decorative layer may comprise a material different than a material of the cover layer. The material of the decorative layer may comprise a color different than a color of the material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depressed feature; (c) an icon. The decorative layer may comprise a laminate. The decorative layer may be laminated on the cover layer. The decorative layer may comprise at least one of (a) a paint material; (b) an ink material. The decorative layer may comprise a depressed feature formed by removal of a portion of the at least one of (a) the paint material; (b) the ink material. The decorative layer may comprise an opaque material. The cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The aperture may comprise at least one of (a) a depressed feature; (b) an icon. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The light guide may be configured to transmit light from the light source to the core of the cover base. The component may comprise a sensor between the light guide and the core of the cover base. The sensor may comprise at least one of (a) a capacitive touch sensor; (b) a capacitive touch film. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; and/or (c) motion at the cover surface. The cover layer may be configured to facilitate vibration of the core of the cover base. The actuator may be coupled to the core of the cover base. The actuator may be configured to deform the cover layer between the core of the cover base and the perimeter of the cover base. The user interface system may comprise a light display configured to transmit light from a light source. The cover structure may comprise a decorative layer on the cover layer; the decorative layer may comprise an aperture configured to transmit light from the light source to present the light display. The cover structure may comprise a decorative layer on the cover layer; the decorative layer may be configured to present an icon illuminated by the light source. The cover layer may be configured to transmit light from the light source between the core of the cover base and the perimeter of the cover base. The input device may comprise a light guide between the light source and the core of the cover base. The light guide may be configured to transmit light from the light source to the core of the cover base. The light guide may be coupled to the actuator. The light guide may be configured to transmit at least one of (a) a force from the actuator to the cover surface; (b) vibration from the actuator to the cover surface; and/or (c) motion from the actuator to the cover surface. The component may comprise a sensor between the light guide and the core of the cover base. The sensor may comprise at least one of (a) a capacitive touch sensor; (b) a capacitive touch film. The cover structure may be configured to facilitate deployment of an airbag into the vehicle interior. The cover base and the cover layer may be configured to break apart to facilitate deployment of the airbag into the vehicle interior. The cover base may comprise a recess formed as an indentation in the rear side of the cover base; the recess may be configured to direct deployment of the airbag through the cover structure. The cover layer may be configured to prevent visibility of the recess in the cover base. The cover structure may comprise a decorative layer on the cover layer; the decorative layer may be configured to prevent visibility of the recess in the cover base. The cover base may comprise a through hole configured to direct deployment of the airbag through the cover structure; the cover layer may be molded in the through hole. The input device may comprise a light guide configured to transmit light from a light source to the core of the cover base. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit.

FIGURES

FIG. 1A is a schematic perspective view of a vehicle according to an exemplary embodiment.

FIGS. 1B and 1C are schematic partial perspective views of a vehicle interior according to an exemplary embodiment.

FIG. 1D is a schematic partial perspective view of a vehicle interior according to an exemplary embodiment.

FIG. 2 is a schematic block diagram of a user interface system for a vehicle interior component according to an exemplary embodiment.

FIG. 3 is a schematic block diagram of connection of a vehicle interior component with a user interface system to vehicle systems according to an exemplary embodiment.

FIG. 40 is a schematic flow diagram of a method of constructing/assembling/manufacturing a component for a vehicle interior according to an exemplary embodiment.

DESCRIPTION

Figure 4:
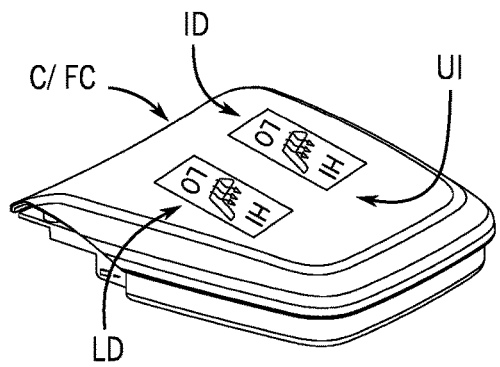
FIG. 4 is a schematic perspective view of a component for a vehicle interior according to an exemplary embodiment.
Figure 5:
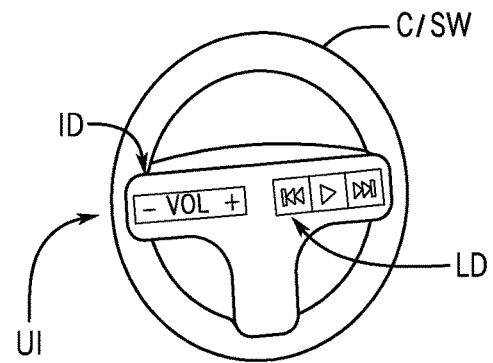
FIG. 5 is a schematic perspective view of a component for a vehicle interior according to an exemplary embodiment.
Figure 6:
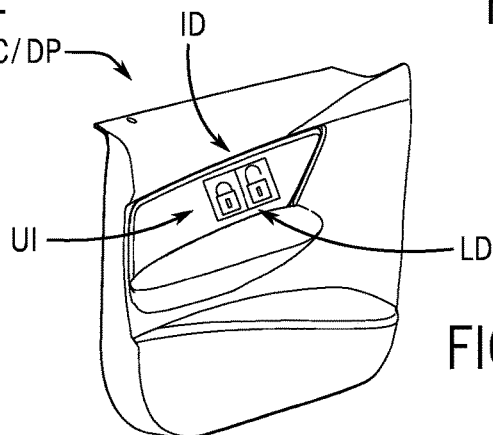
FIG. 6 is a schematic perspective view of a component for a vehicle interior according to an exemplary embodiment.
Figure 7:
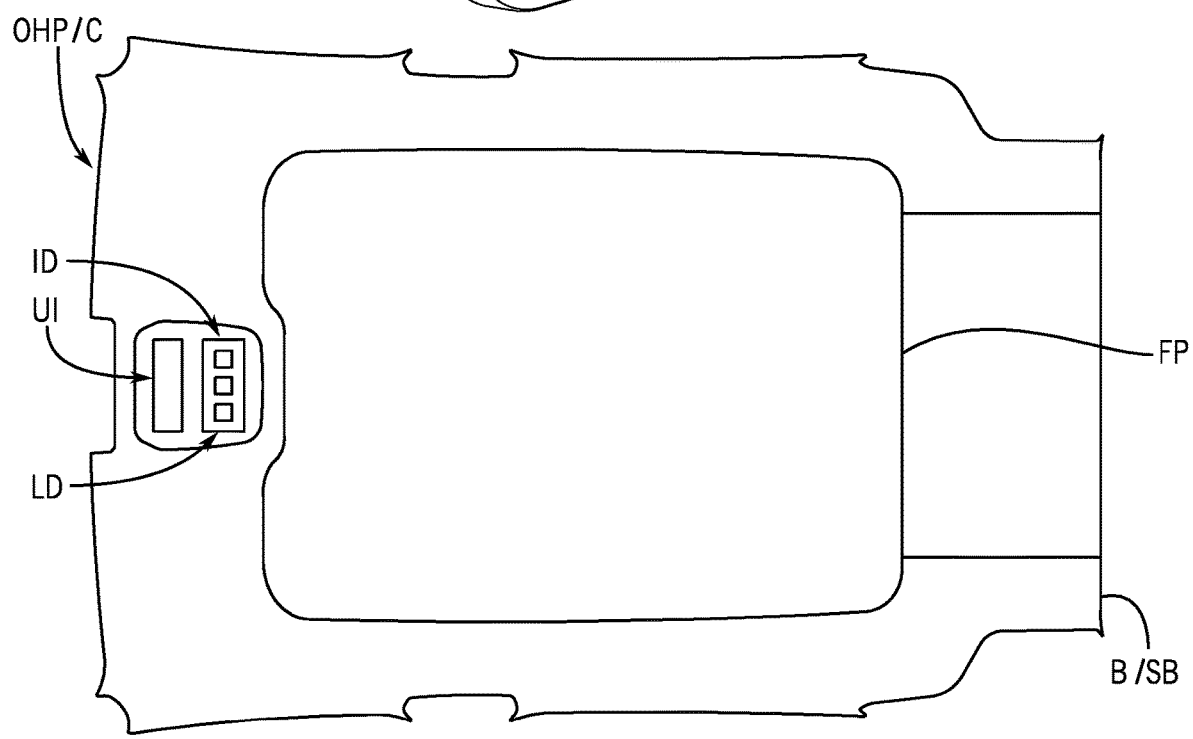
FIG. 7 is a schematic plan view of a component for a vehicle interior according to an exemplary embodiment.
Figure 8A:
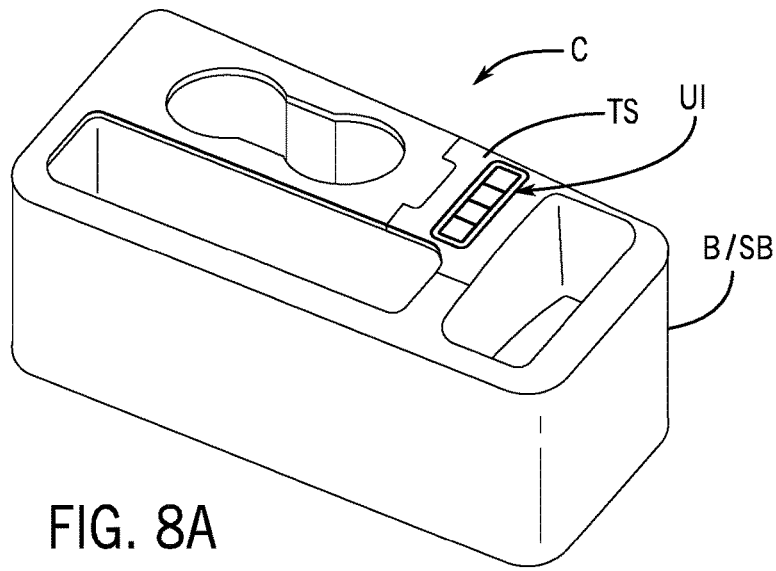
FIG. 8A is a schematic perspective view of a component for a vehicle interior according to an exemplary embodiment.
Figure 8B:
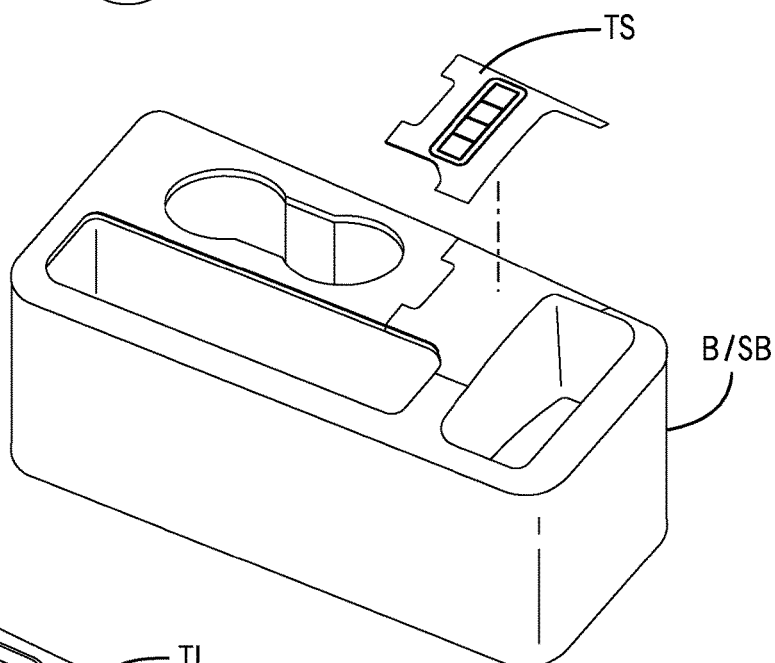
FIG. 8B is a schematic exploded perspective view of a component for a vehicle interior according to an exemplary embodiment.
Figure 8C:
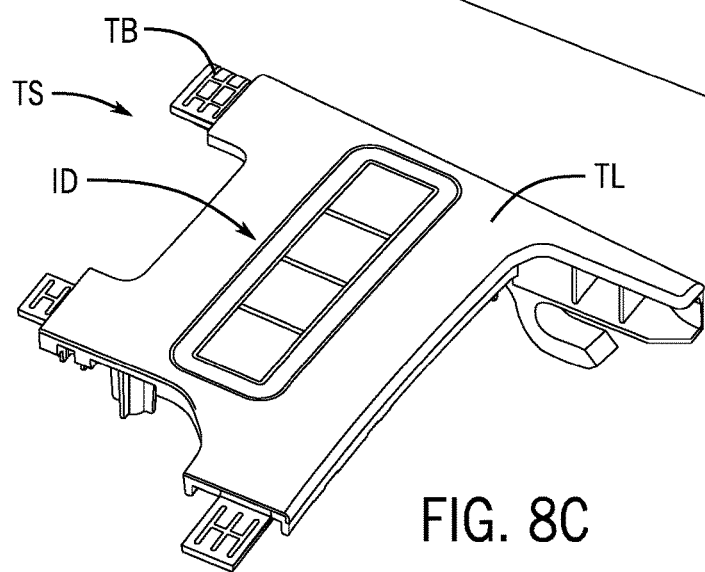
FIG. 8C is a schematic perspective view of a component for a vehicle interior according to an exemplary embodiment.
Figure 9A:
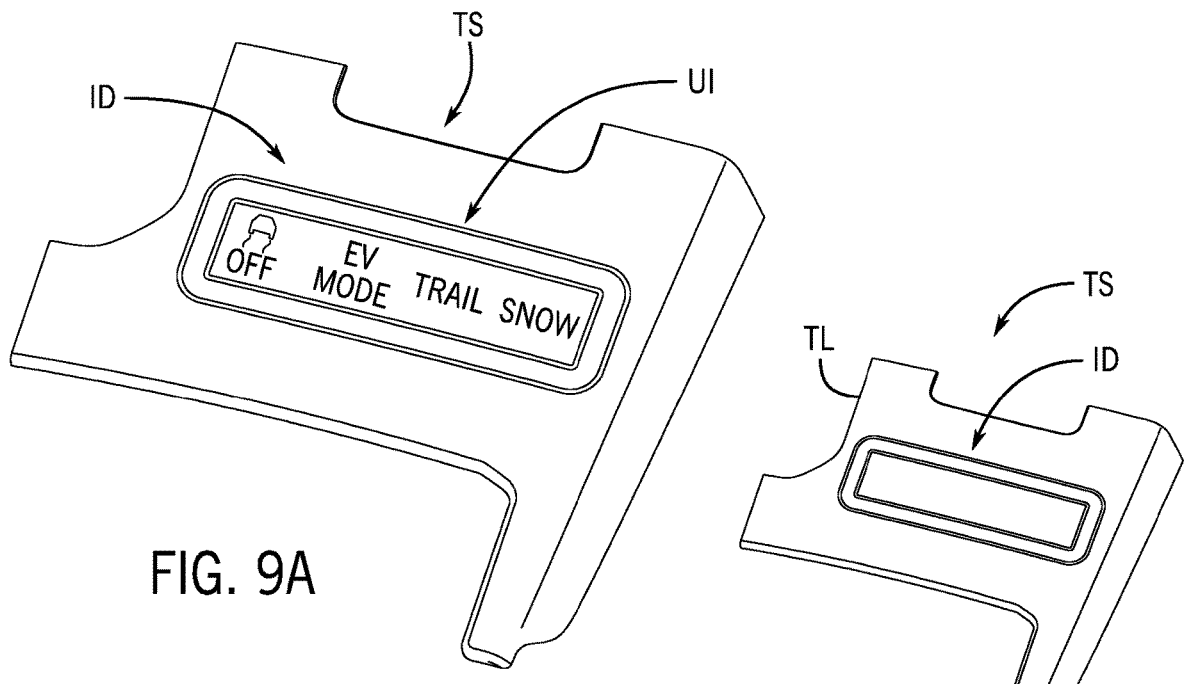
FIG. 9A is a schematic perspective view of a component for a vehicle interior according to an exemplary embodiment.
Figure 9B:
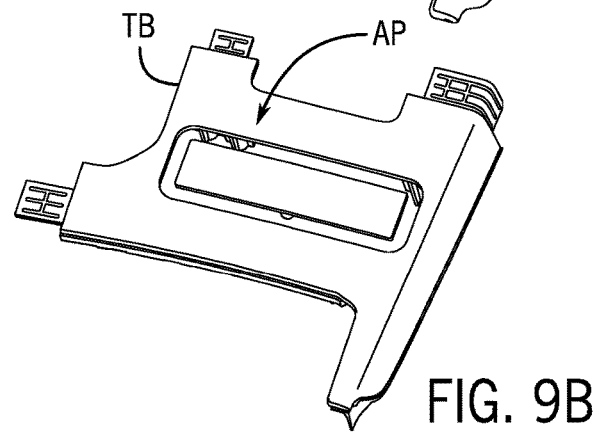
FIG. 9B is a schematic exploded perspective view of a component for a vehicle interior according to an exemplary embodiment.
Figure 9C:
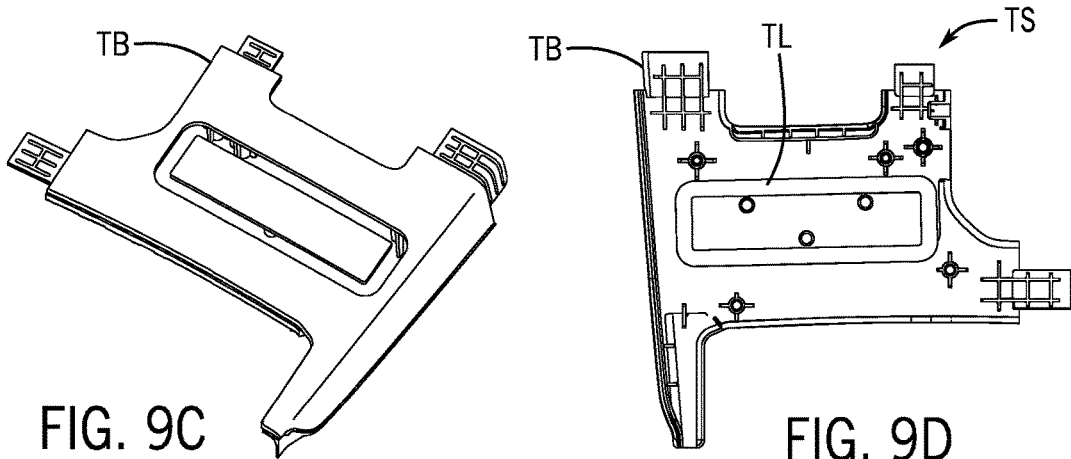
FIG. 9C is a schematic perspective view of a component for a vehicle interior according to an exemplary embodiment.
Figure 9D:
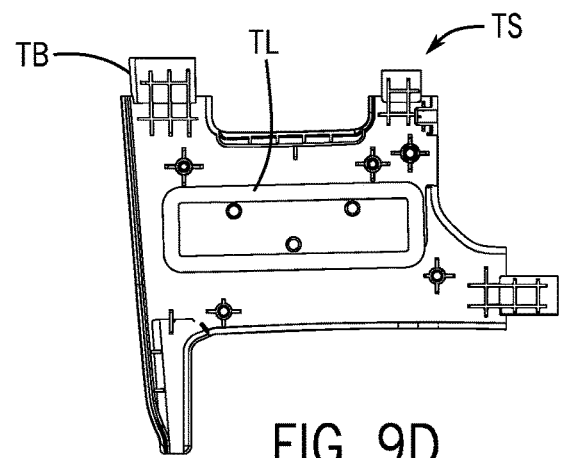
FIG. 9D is a schematic plan view of a component for a vehicle interior according to an exemplary embodiment.
Figure 10A:
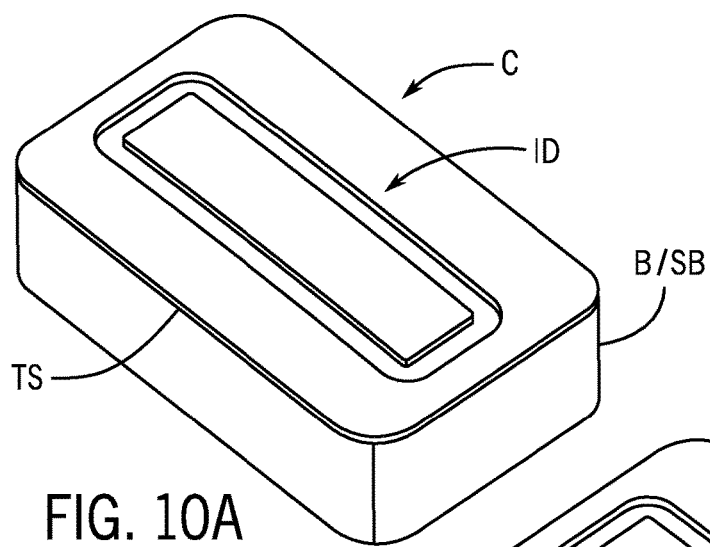
FIG. 10A is a schematic perspective view of a component for a vehicle interior according to an exemplary embodiment.
Figure 10B:
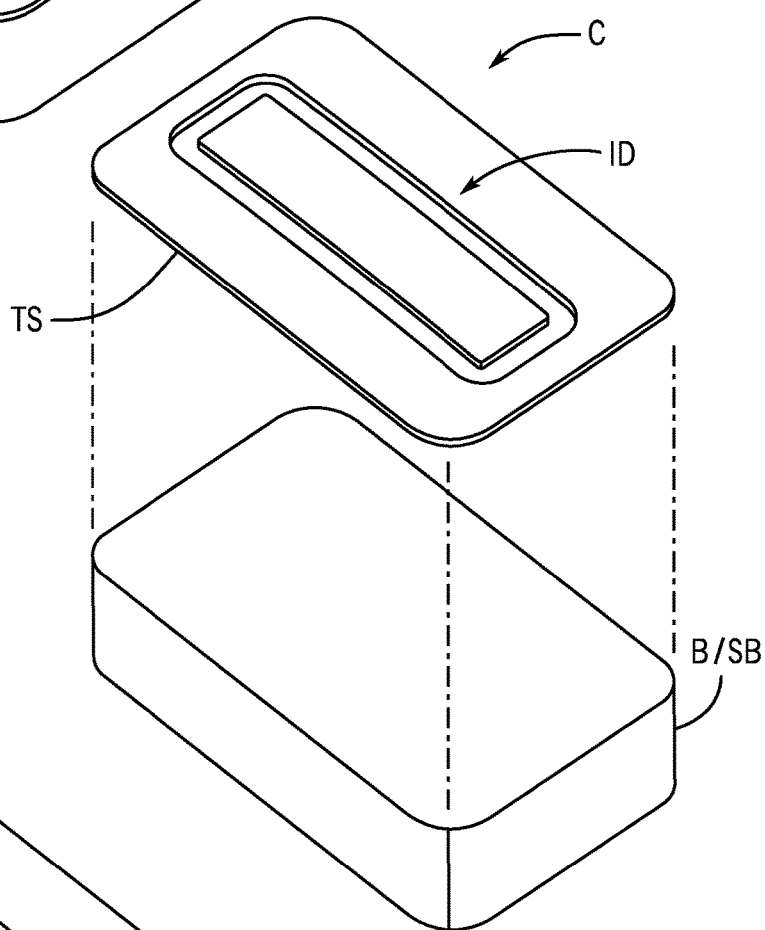
FIG. 10B is a schematic exploded perspective view of a component for a vehicle interior according to an exemplary embodiment.
Figure 10C:
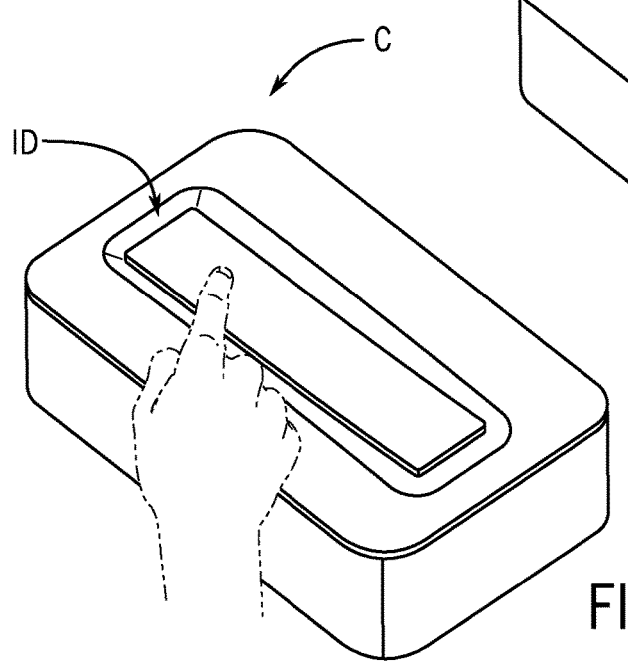
FIG. 10C is a schematic perspective view of a component for a vehicle interior according to an exemplary embodiment.
Figure 11:
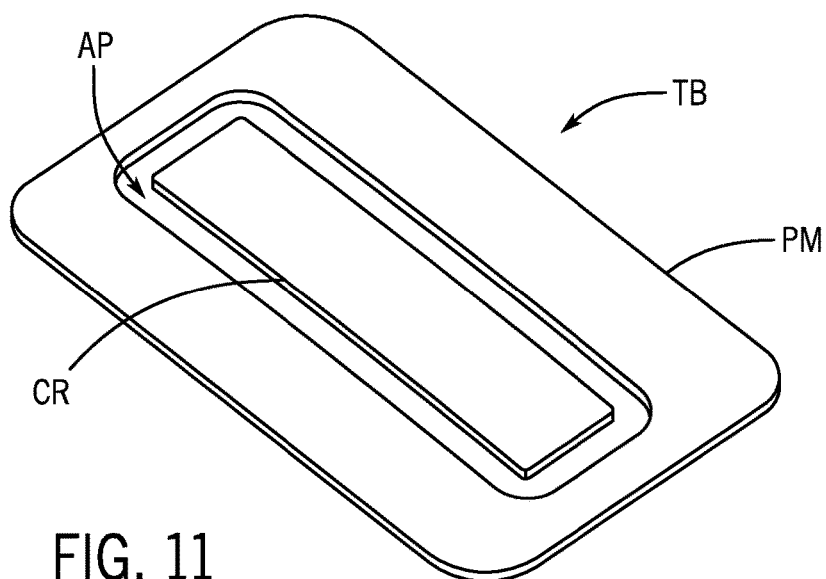
FIG. 11 is a schematic perspective view of a subcomponent of a component for a vehicle interior according to an exemplary embodiment.
Figure 12:
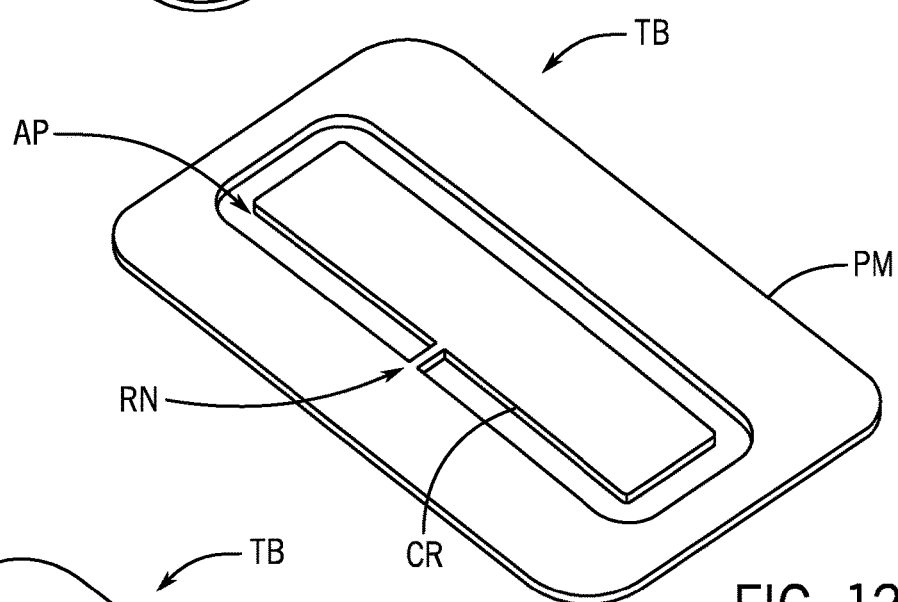
FIG. 12 is a schematic perspective view of a subcomponent of a component for a vehicle interior according to an exemplary embodiment.
Figure 13:
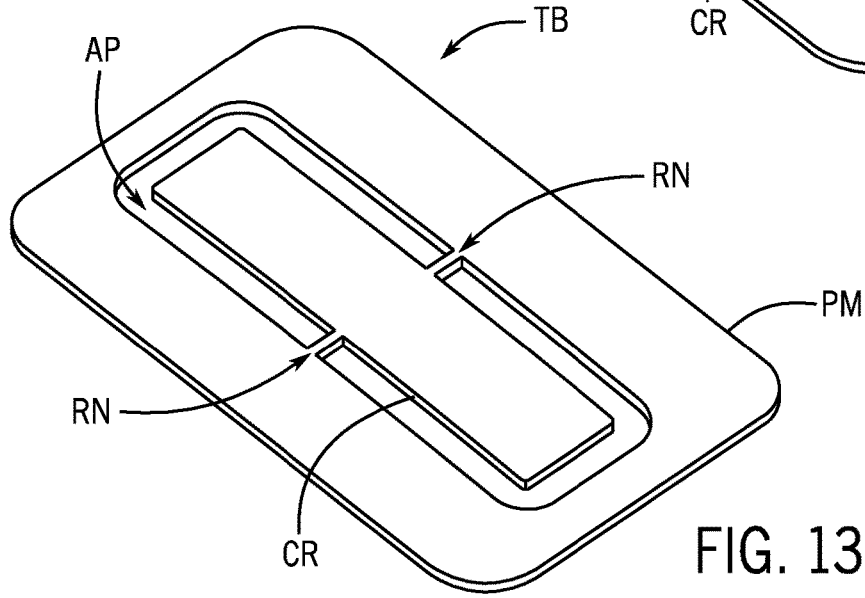
FIG. 13 is a schematic perspective view of a subcomponent of a component for a vehicle interior according to an exemplary embodiment.
Figure 14A:
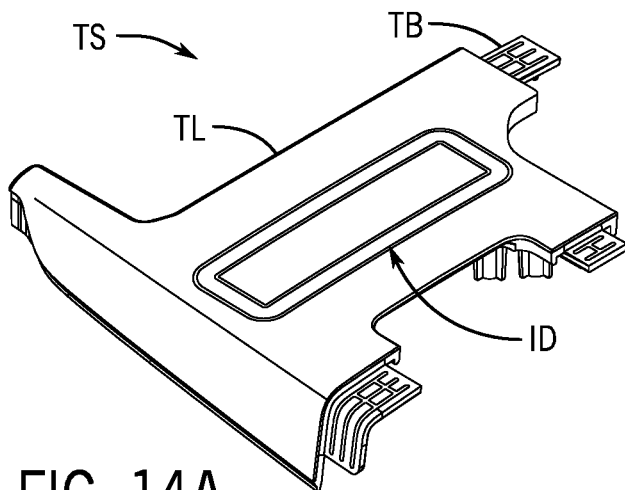
FIG. 14A is a schematic perspective view of a component for a vehicle interior according to an exemplary embodiment.
Figure 14B:
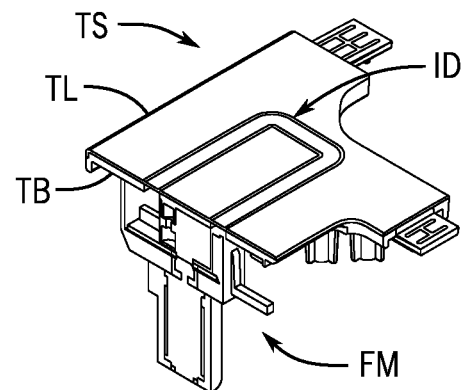
FIG. 14B is a schematic section perspective view of a component for a vehicle interior according to an exemplary embodiment.
Figure 14C:
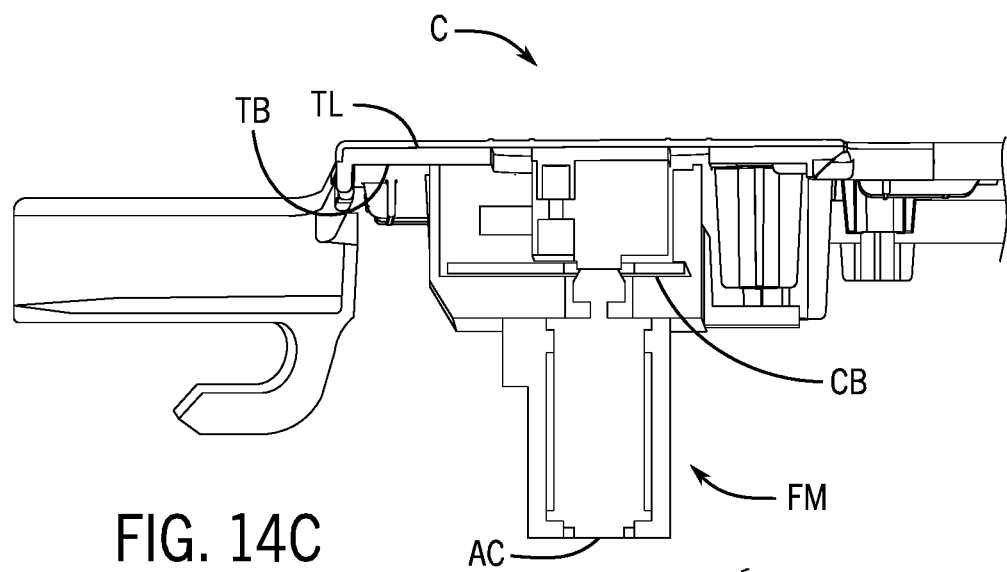
FIG. 14C is a schematic section view of a component for a vehicle interior according to an exemplary embodiment.
Figure 14D:
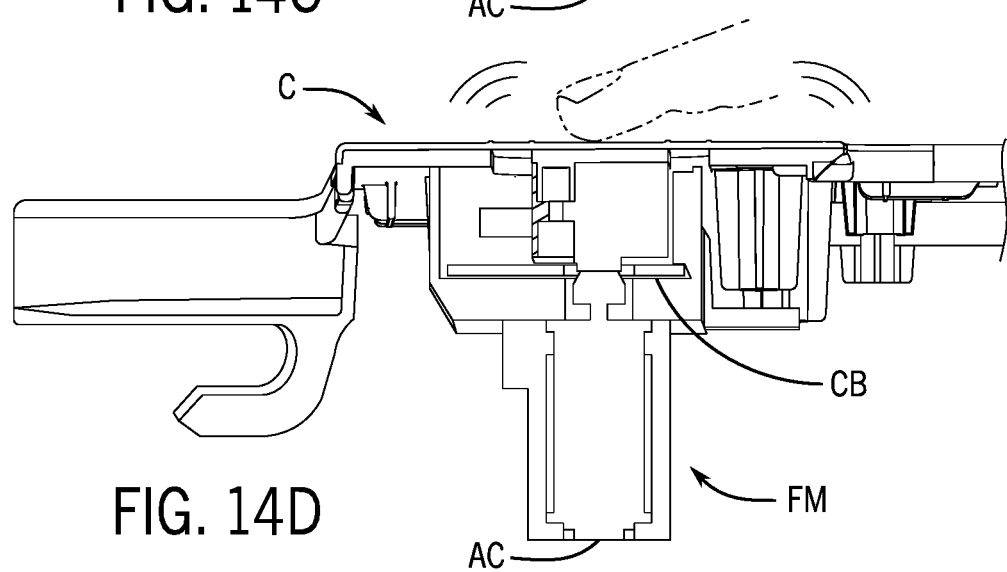
FIG. 14D is a schematic section view of a component for a vehicle interior according to an exemplary embodiment.
Figure 15A:
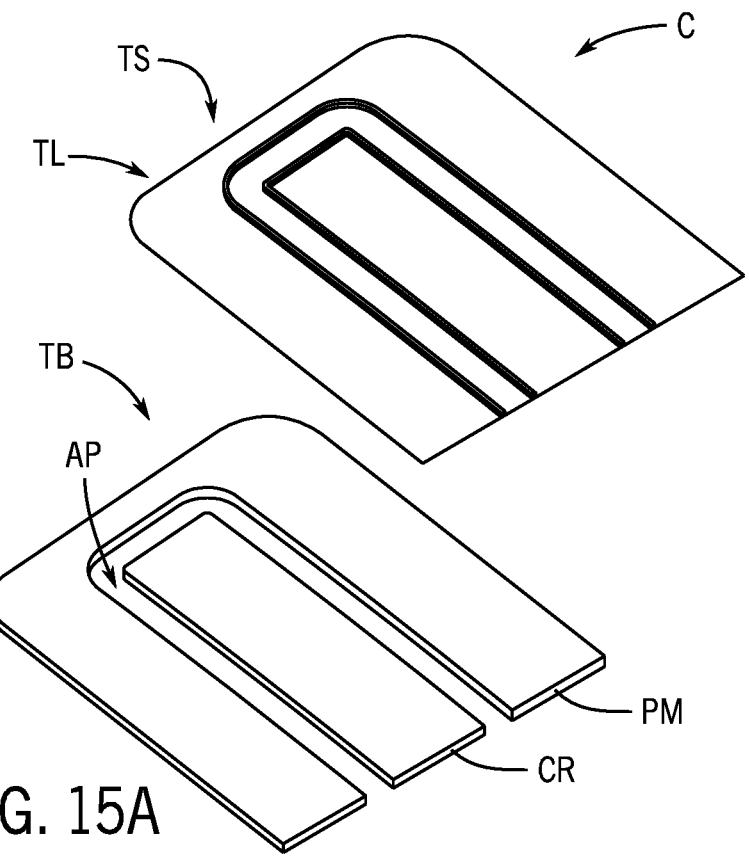
FIG. 15A is a schematic exploded partial perspective view of a component for a vehicle interior according to an exemplary embodiment.
Figure 15B:
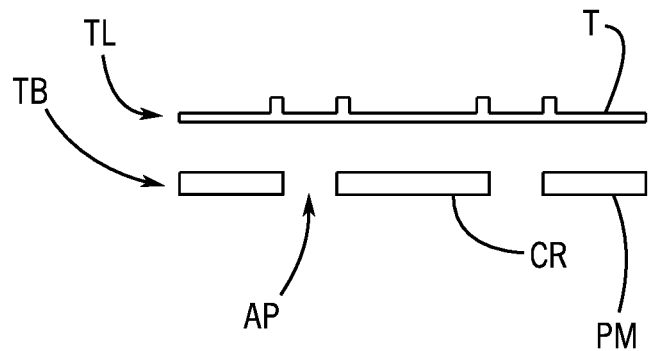
FIG. 15B is a schematic exploded partial section view of a component for a vehicle interior according to an exemplary embodiment.
Figure 15C:
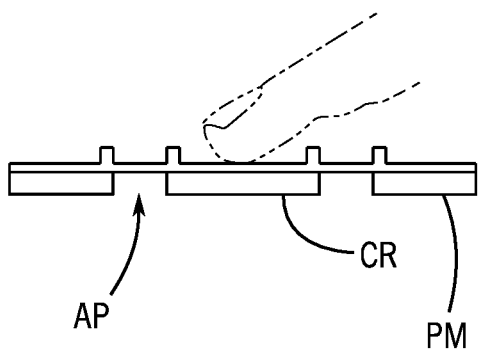
FIG. 15C is a schematic partial section view of a component for a vehicle interior according to an exemplary embodiment.
Figure 16A:
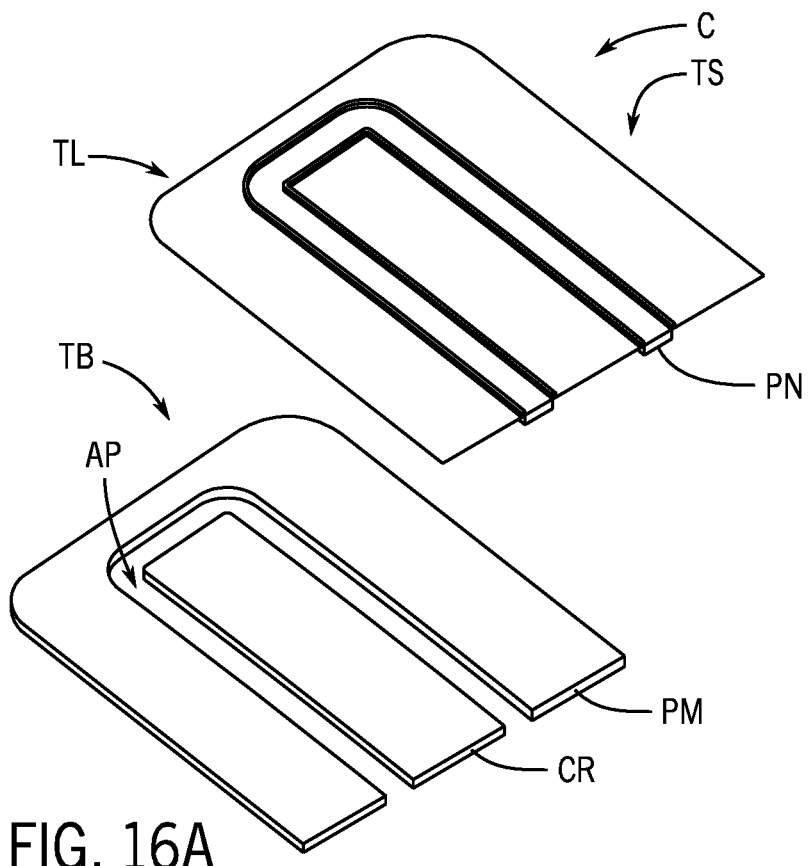
FIG. 16A is a schematic exploded partial perspective view of a component for a vehicle interior according to an exemplary embodiment.
Figure 16B:
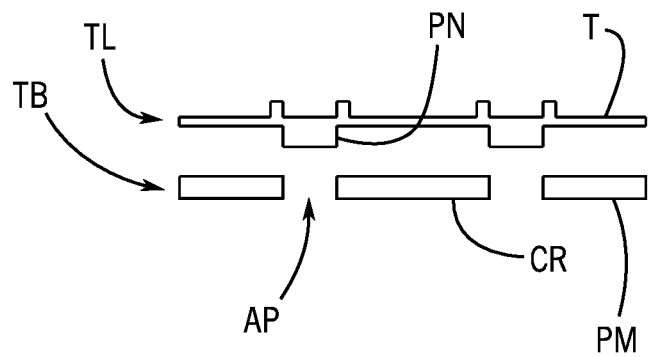
FIG. 16B is a schematic exploded partial section view of a component for a vehicle interior according to an exemplary embodiment.
Figure 16C:
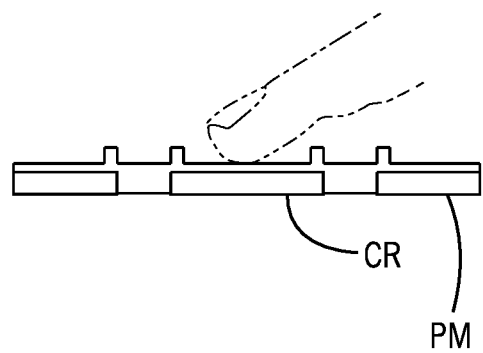
FIG. 16C is a schematic partial section view of a component for a vehicle interior according to an exemplary embodiment.
Figure 17A:
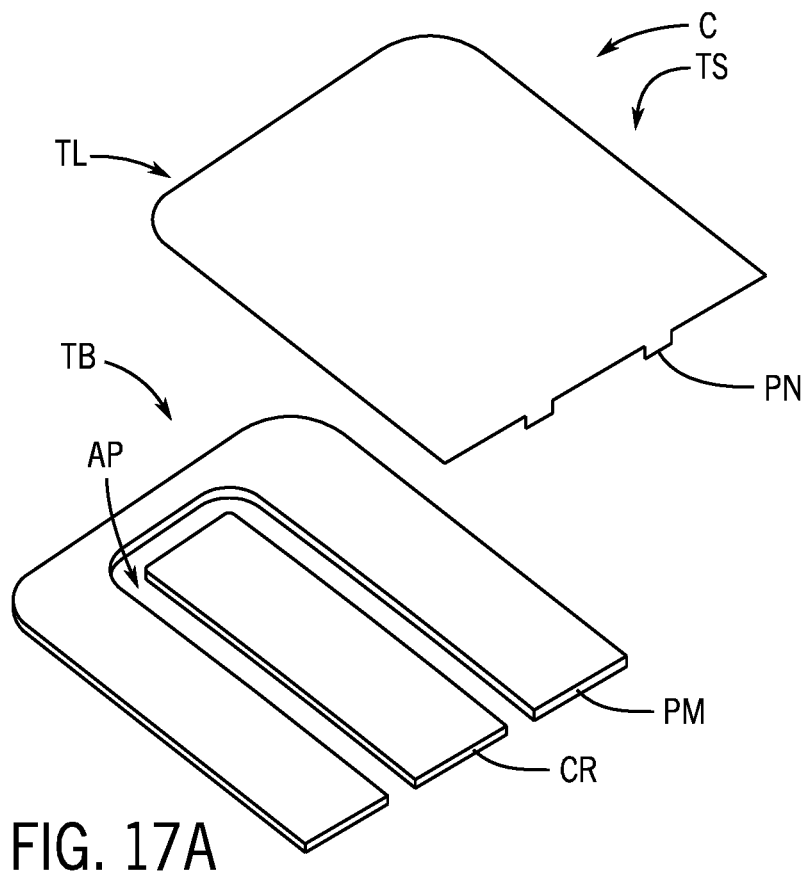
FIG. 17A is a schematic exploded partial perspective view of a component for a vehicle interior according to an exemplary embodiment.
Figure 17B:
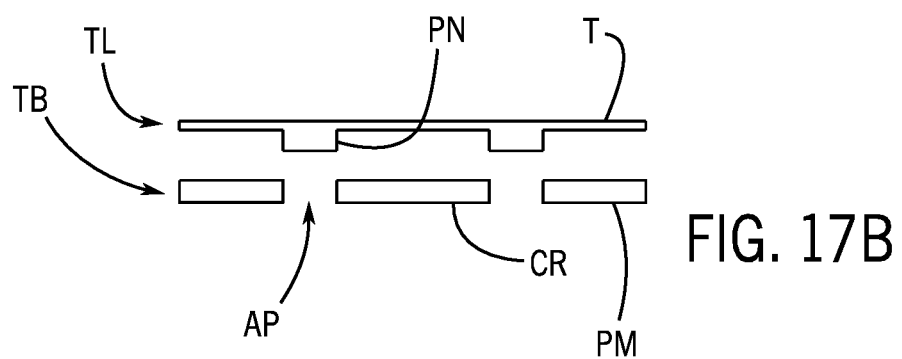
FIG. 17B is a schematic exploded partial section view of a component for a vehicle interior according to an exemplary embodiment.
Figure 17C:
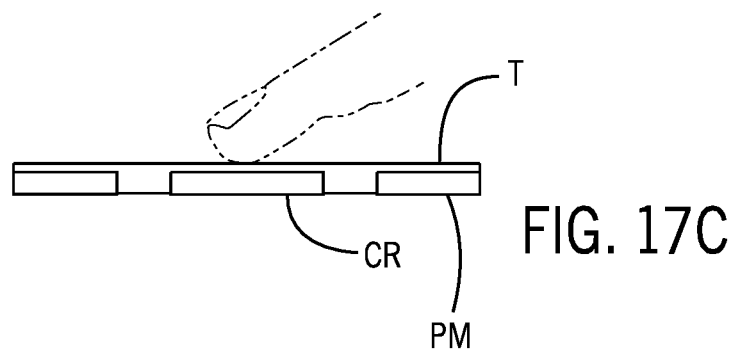
FIG. 17C is a schematic partial section view of a component for a vehicle interior according to an exemplary embodiment.
Figure 18A:
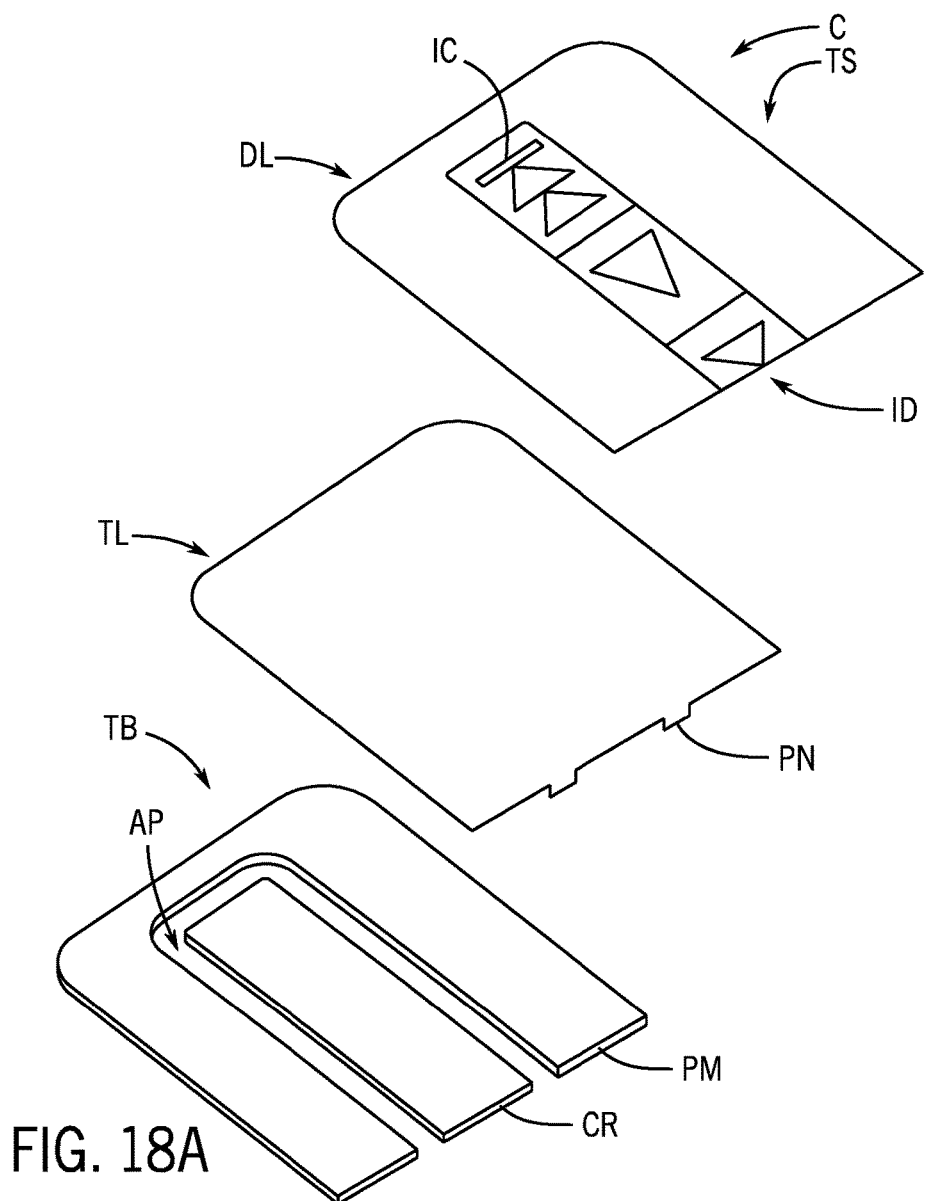
FIG. 18A is a schematic exploded partial perspective view of a component for a vehicle interior according to an exemplary embodiment.
Figure 18B:
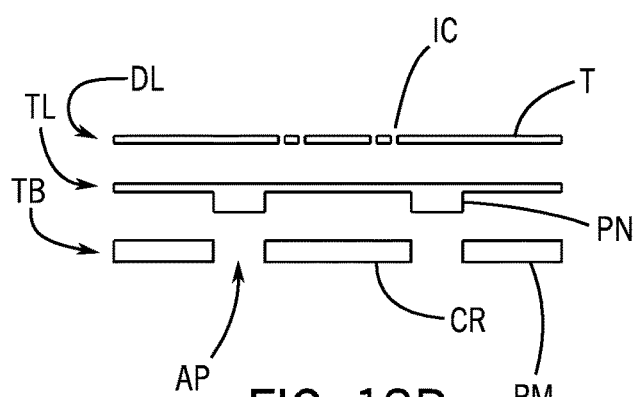
FIG. 18B is a schematic exploded partial section view of a component for a vehicle interior according to an exemplary embodiment.
Figure 18C:
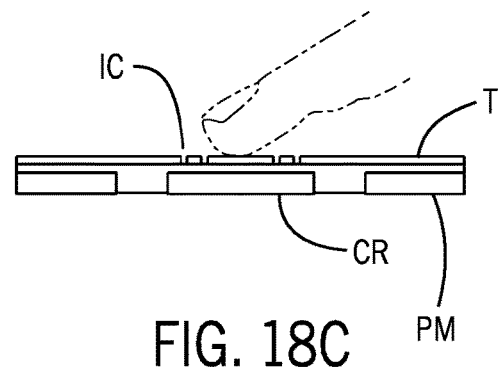
FIG. 18C is a schematic partial section view of a component for a vehicle interior according to an exemplary embodiment.
Figure 19A:
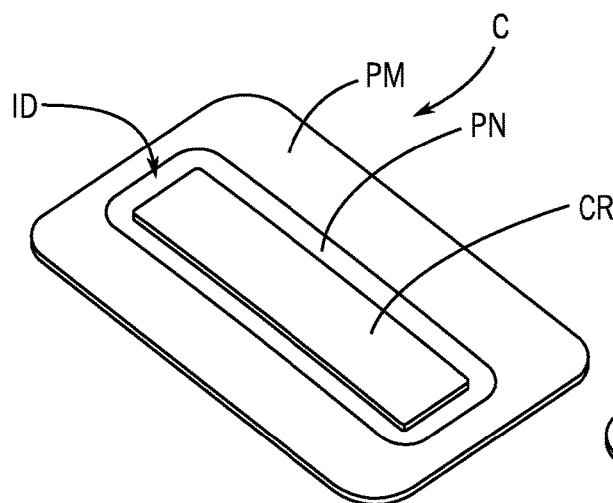
FIGS. 19A and 19B are schematic partial perspective views of a component for a vehicle interior according to an exemplary embodiment.
Figure 19B:
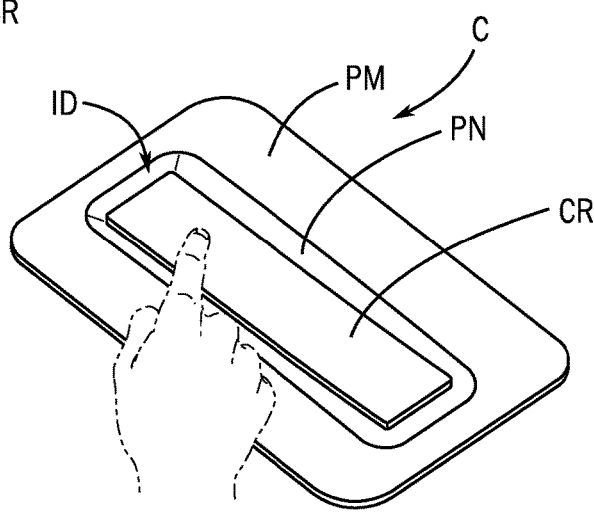
Figure 19C:
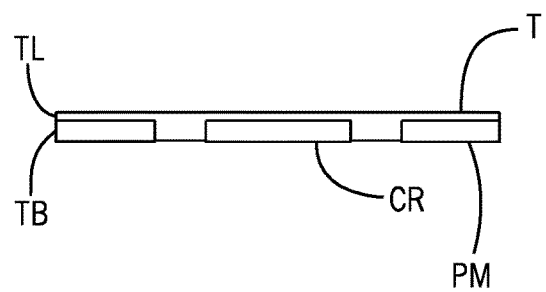
FIGS. 19C and 19D are schematic partial section views of a component for a vehicle interior according to an exemplary embodiment.
Figure 19D:
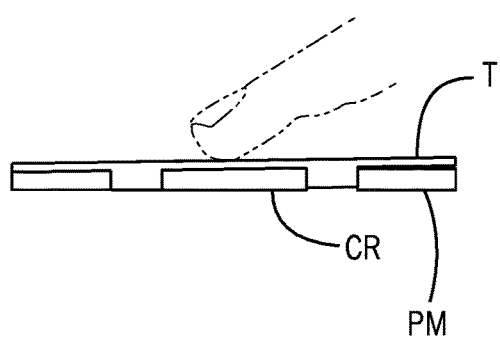
Figure 20A:
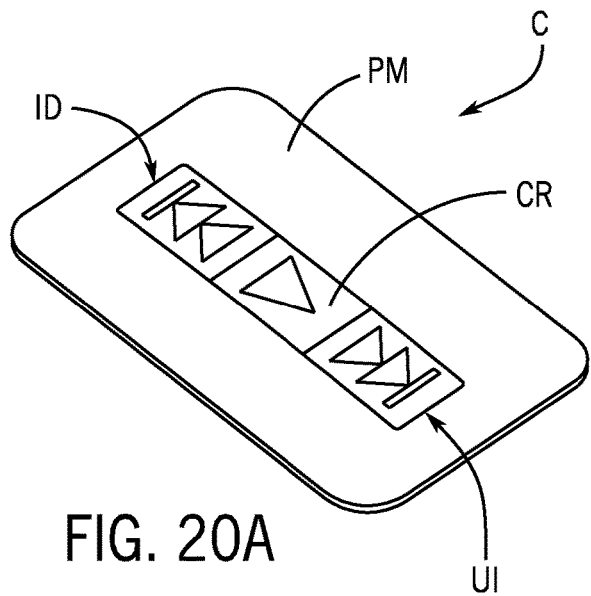
FIGS. 20A and 20B are schematic partial perspective views of a component for a vehicle interior according to an exemplary embodiment.
Figure 20B:
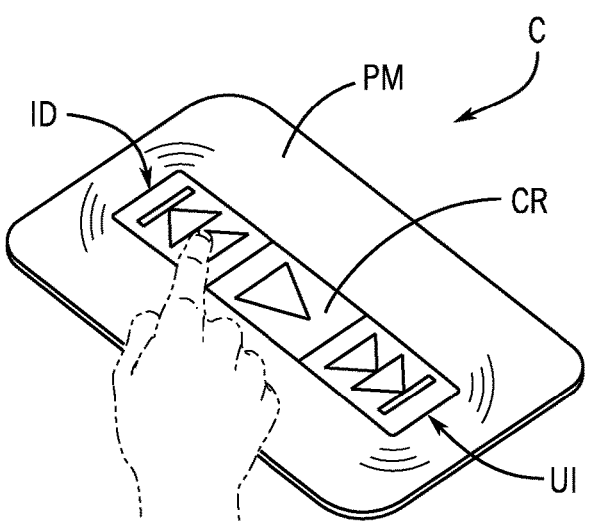
Figure 20C:
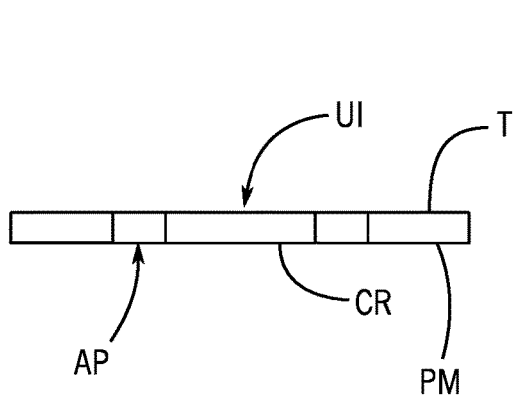
FIGS. 20C and 20D are schematic partial section views of a component for a vehicle interior according to an exemplary embodiment.
Figure 20D:
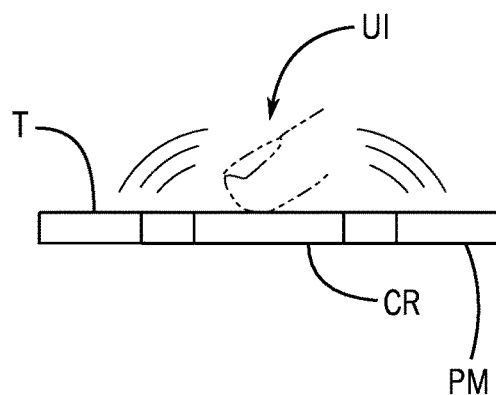
Figure 21A:
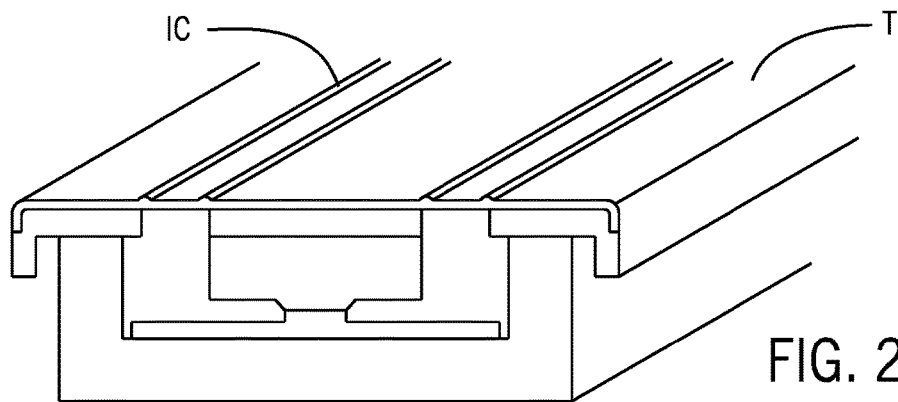
FIG. 21A is a schematic section perspective view of a component for a vehicle interior according to an exemplary embodiment.
Figure 21B:
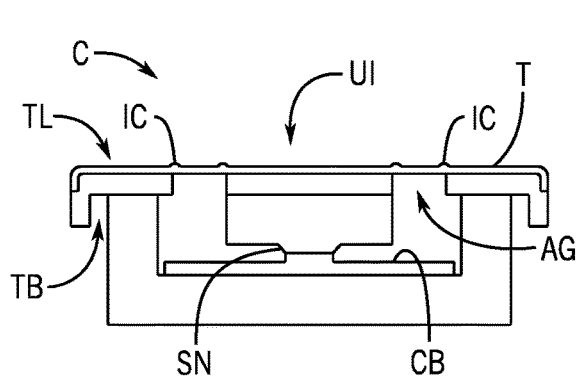
FIGS. 21B and 21C are schematic partial section views of a component for a vehicle interior according to an exemplary embodiment.
Figure 21C:
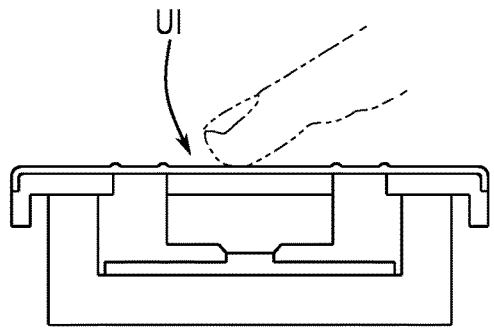
Figure 22:
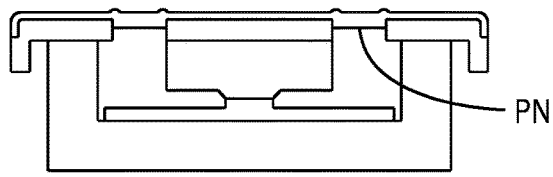
FIG. 22 is a schematic partial section view of a component for a vehicle interior according to an exemplary embodiment.
Figure 23:
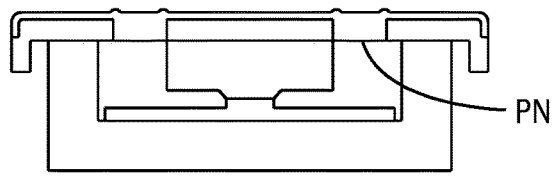
FIG. 23 is a schematic partial section view of a component for a vehicle interior according to an exemplary embodiment.
Figure 24:
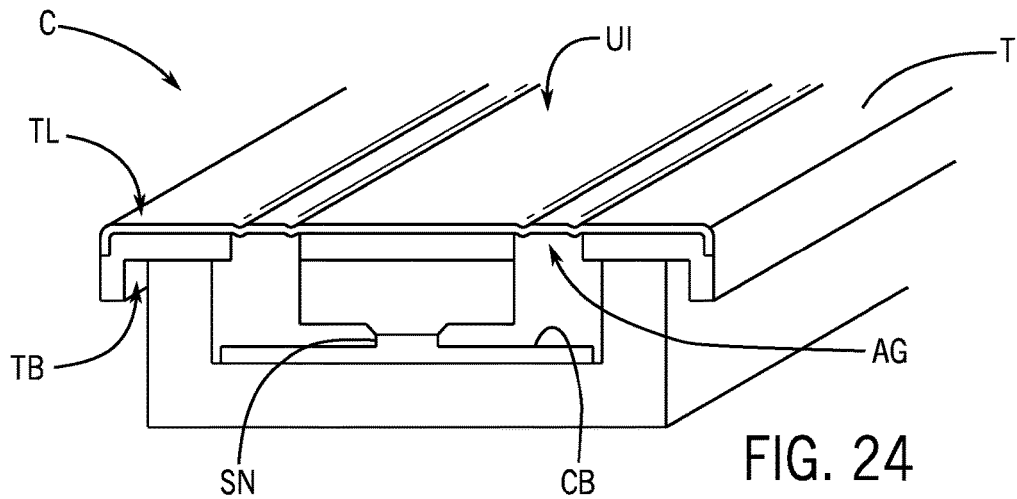
FIG. 24 is a schematic section perspective view of a component for a vehicle interior according to an exemplary embodiment.
Figure 25:
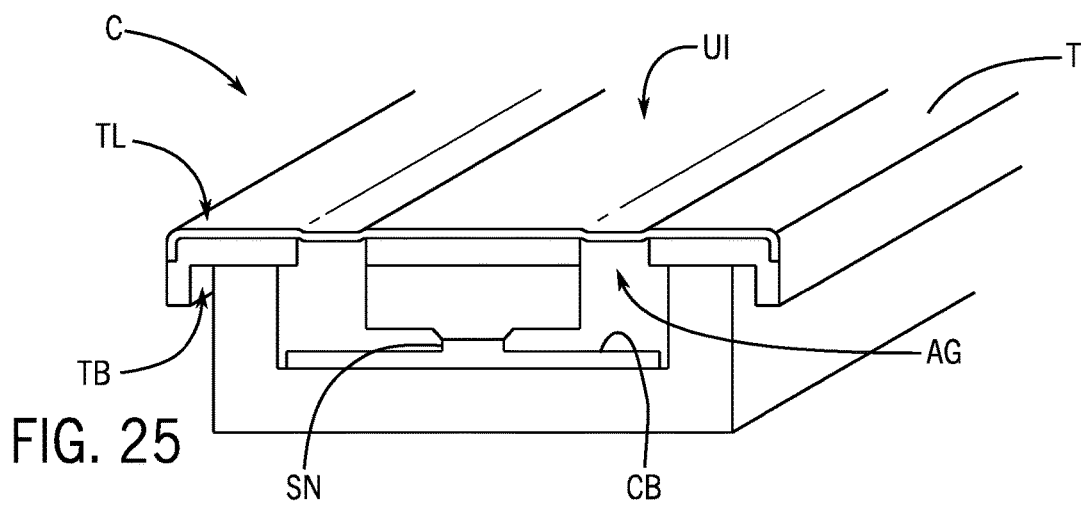
FIG. 25 is a schematic section perspective view of a component for a vehicle interior according to an exemplary embodiment.
Figure 26:
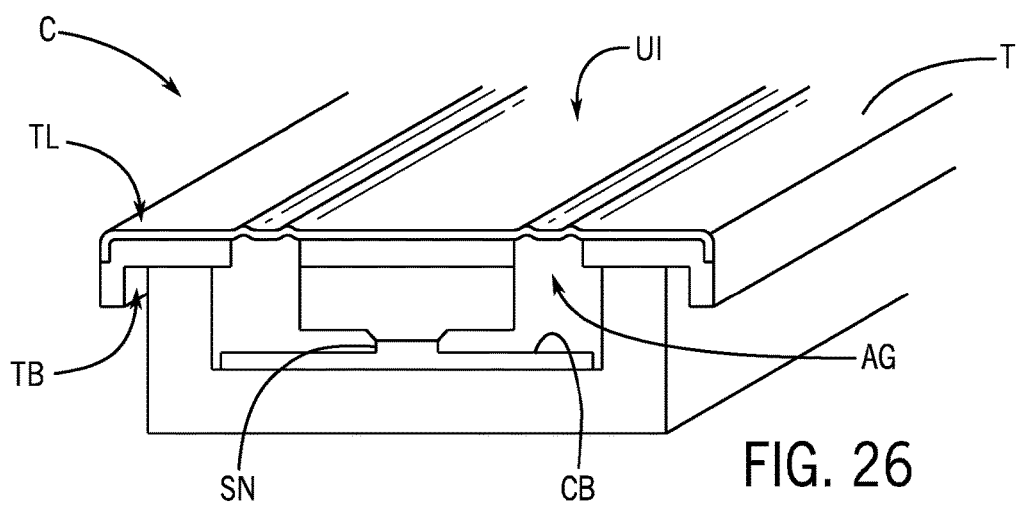
FIG. 26 is a schematic section perspective view of a component for a vehicle interior according to an exemplary embodiment.
Figure 27:
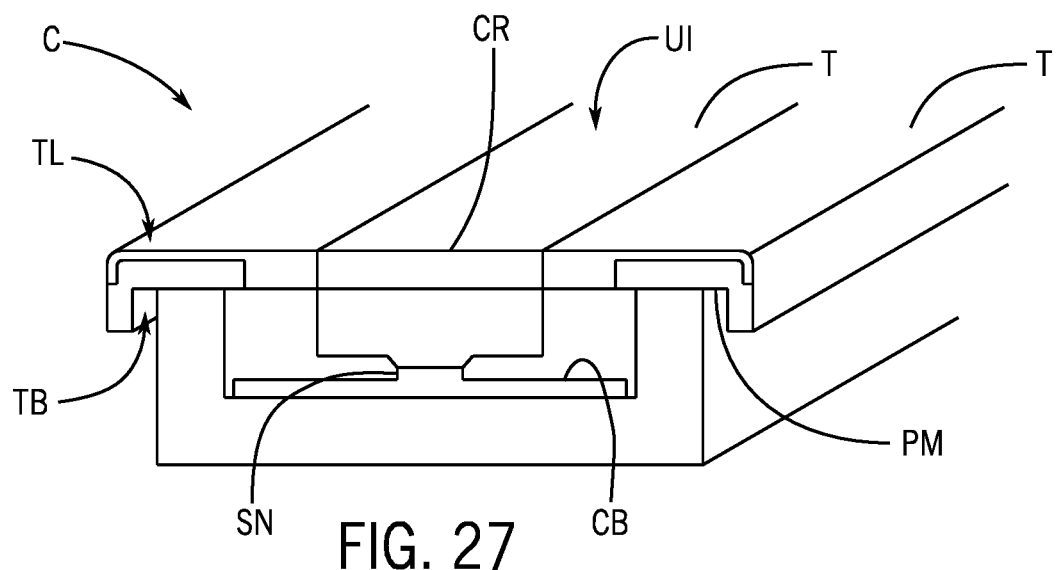
FIG. 27 is a schematic section perspective view of a component for a vehicle interior according to an exemplary embodiment.
Figure 28:
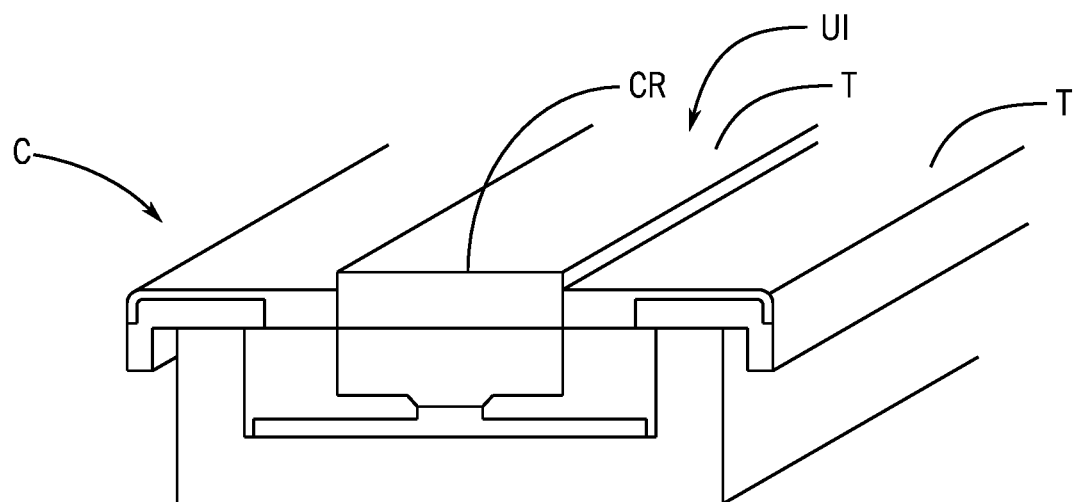
FIG. 28 is a schematic section perspective view of a component for a vehicle interior according to an exemplary embodiment.
Figure 29:
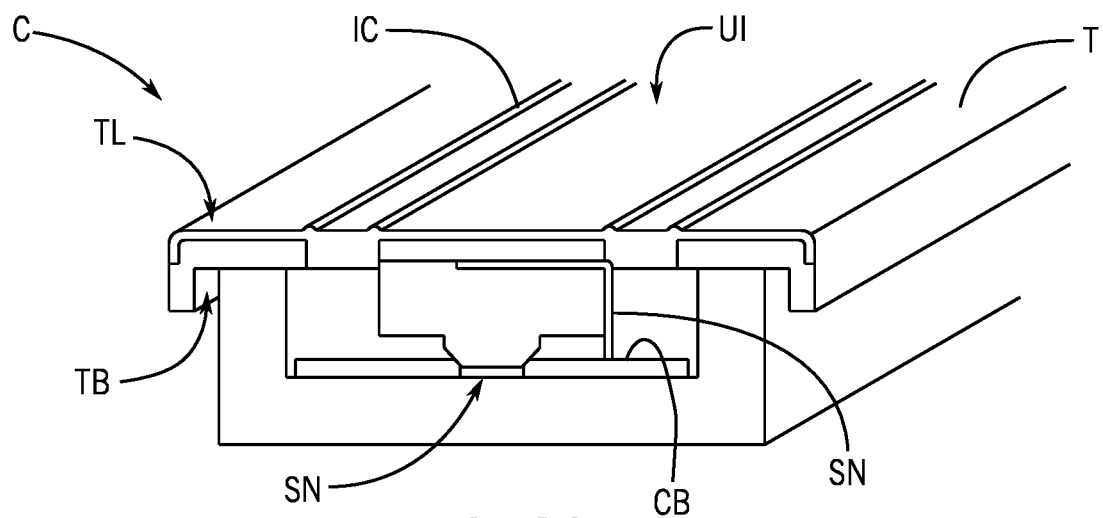
FIG. 29 is a schematic section perspective view of a component for a vehicle interior according to an exemplary embodiment.
Figure 30:
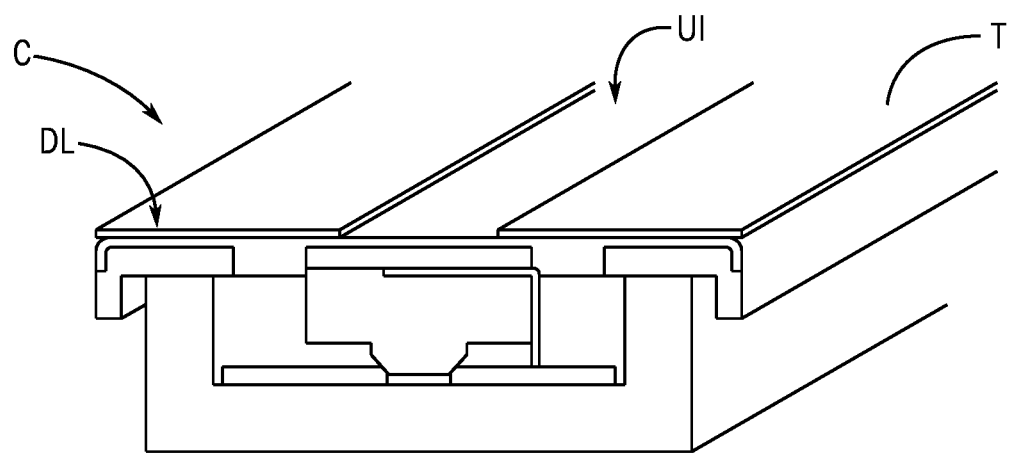
FIG. 30 is a schematic section perspective view of a component for a vehicle interior according to an exemplary embodiment.
Figure 31:
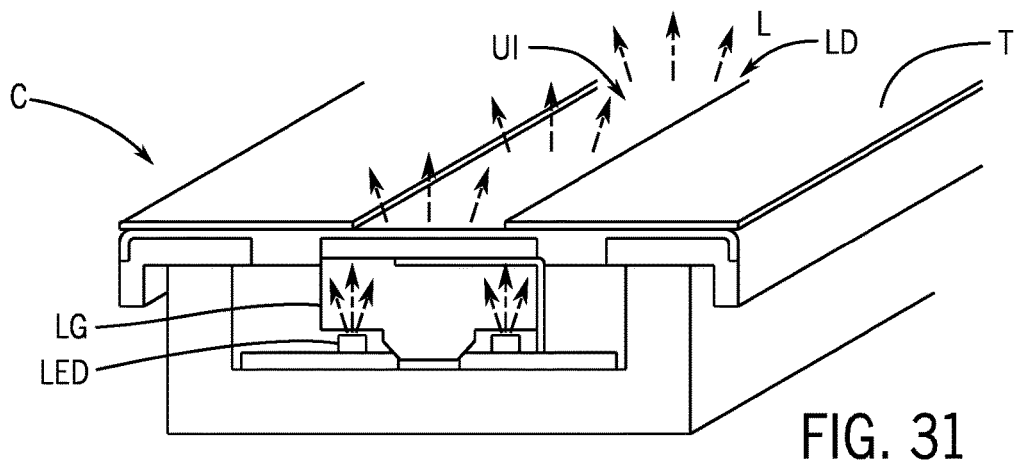
FIG. 31 is a schematic section perspective view of a component for a vehicle interior according to an exemplary embodiment.

Referring to FIGS. 1A and 1B, a vehicle V is shown schematically with an interior I. According to an exemplary embodiment as shown schematically in FIG. 1C, the vehicle interior may comprise vehicle interior components C shown (for example) as a console such as a floor console FC, a steering wheel SW, a door panel DP and an instrument panel IP. As indicated schematically according to an exemplary embodiment in FIGS. 4-7, the vehicle interior may comprise vehicle interior components C shown (for example) as a console such as a floor console FC, a steering wheel SW, a door panel DP and an overhead panel OHP.

Referring to FIGS. 1A-1D, a vehicle V is shown schematically with a vehicle interior I providing components C including a trim panel, an instrument panel IP, a door panel DP, a console such as a floor console FC and an overhead console for an overhead system/panel OHP, an operator control such as a steering wheel SW and seating for vehicle occupants shown as seats SZ. See also FIGS. 4, 5, 6, 7 and 8A-8C.

As indicated schematically according to an exemplary embodiment in FIGS. 1B-1D, 2 and 3, a component C may comprise a user interface system UIS configured to present a user interface UI comprising an input device (such as a sensor, switch, button, audio device, video device, etc.) and/or an output device (such as a light display, haptics transducer, audio device, video device, etc.). See also FIGS. 4, 5, 6, 7 and 8A-8C. As indicated schematically in FIGS. 4, 5, 6, 7 and 8A-8C, component C with user interface UI comprising input device ID and/or output device such as light display LD may comprise a console FC providing an armrest, a steering wheel SW, a door panel DP, an overhead system/panel OHP with a panel shown as fiber panel FP and base S/SB, etc. See also FIGS. 8A-8C, 10A-10C and 34A-34C.

As indicated schematically in FIGS. 1C-1D, 2 and 3, component C may comprise a module configured to provide a user interface system UIS configured to provide user interface UI with input device ID and output device such as light display LD with a functional module FM and/or control module CM. As indicated schematically according to an exemplary embodiment in FIGS. 1C-1D, 2, 3, 4, 5, 6, 7 and 8A-8C, component C may provide user interface system UIS with user interface UI comprising the input device ID as an operator control for at least one vehicle system VS or with a connection to a network such as a vehicle network VN and/or other network N (including the internet); the vehicle system may comprise at least one of a vehicle communication system, vehicle entry locks, an HVAC system, an occupant comfort system, an occupant safety system, vehicle lighting, a vehicle entertainment system, a vehicle audio system, vehicle instrumentation, vehicle status information, vehicle operation system, mobile device connectivity, network connectivity.

As indicated schematically according to an exemplary embodiment in FIGS. 1C-1D, 2, 3, 4, 5, 6, 7, 8A-8C and 10A-10C, component C may comprise an assembly comprising a composite structure such as a cover structure TS and base/substrate B/SB and a functional module FM for the user interface system with input device and output device; the functional module may be configured with or to operate at least one of a sensor or a switch or a detector or a light display or a display panel or a control panel or a transducer or a haptics actuator or a haptics transducer, etc.; user interface system UIS may be configured to provide the user interface (input device and/or output device) with functional module FM. See also FIGS. 2, 3 and 14A-14D. The user interface system may comprise an interface with the functional module; the functional module may be coupled to vehicle systems and/or to a network. See FIGS. 2 and 3.

As indicated schematically according to an exemplary embodiment in FIGS. 4, 5, 6, 7, 8A-8C, 9A-9D, 10A-10C, 11, 12, 13, 14A-14D, 15A-15C, 16A-16C, 17A-17C, 18A-18C, 19A-19D and 20A-20D, component C may comprise an assembly comprising a composite structure comprising cover structure TS and base/substrate B/SB in any of a variety of configurations and arrangements. See also FIGS. 21A-21C, 22, 23, 24, 25, 26, 27, 28, 29, 30, 31, 32, 33, 35, 36, 37 and 38. As indicated schematically, the composite structure may comprise a cover structure comprising a cover base and a cover layer configured to provide the user interface with an input device and/or an output device. The input device may comprise at least one of a sensor and/or a switch, a detector, a capacitive sensor, a touch sensor, a mechanical switch, etc.; the output device may comprise at least one of a light display and/or a haptics transducer; the light display may comprise a panel, a display panel, a button panel, lighting such as LED lighting, a light guide, etc.; the light display may be configured to present an image and/or icon display; the light display may be configured to present a decorative effect comprising an illuminated state and an unilluminated state; the haptics transducer may comprise a vibrating device/transducer to provide a tactile vibration for a haptics system; the user interface system may comprise a haptics system comprising a transducer and an actuator that may be actuated by the input device; the user interface system may comprise an output device comprising a haptics system for the user interface.

As indicated schematically according to an exemplary embodiment in FIGS. 9A-9D, 10A-10C, 11, 12, 13, 14A-14D, 15A-15C, 16A-16C, 17A-17C, 18A-18C, 19A-19D, 20A-20D, 21A-21C, 22, 23, 24, 25, 26, 27, 28, 29, 30, 31, 32, 33, 35, 36, 37 and 38, component C with composite structure comprising base B/SB with cover structure TS with cover base TB and cover layer TL may be formed in a variety of configurations and arrangements; the cover structure may be configured to present a variety of structural arrangements and a variety of decorative effects and configurations of a user interface with an input device and/or an output device for interaction with a vehicle operator (such as by touch, push, etc.). See also FIGS. 2, 3, 4, 5, 6, 7 and 8A-8C. As indicated schematically according to an exemplary embodiment, the composite structure of the component may comprise a cover structure TS with a cover base TB and cover layer TL; the cover structure TS may comprise a core CR and perimeter PM comprising a feature such as an aperture AP (FIGS. 10A-10C and 11) and/or a connector/runner RN (FIGS. 12 and 13) and an arrangement with projection PN and/or gap AG (FIGS. 16A-16C, 17A-17C, 19A-19D, 22 and 23) and an arrangement with gap AG (FIGS. 24, 25, 26) and a decorative layer DL such as with elements such as presenting indicia/icons IC (FIGS. 18A-18C and 20A-20D) and integration with sensor SN such as detector element/layer (FIGS. 24, 25, 26, 27, 28, 29, 30, 35, 36, 37) and lighting system with a cover structure providing light-transmissive elements/segments for transmission of light L such as from light guide LG and/or LED lighting (FIGS. 31, 32, 33 and 38) and output device such as by a haptic system in a functional module that may comprise actuator AC (FIGS. 20A-20D and 32) and or a rib/set of ribs or groove/indentation arrangement (FIGS. 21A-21C, 22, 23, 24, 25, 26, 27, 28 and 29) and a decorative layer DL (FIGS. 18A-18C and 30). The cover structure may be configured to provide a decorative effect at the surface/cover layer; the decorative effect may comprise the input device for the user interface; the decorative effect may comprise an image, indicia, icon, set of icon, indicators, set of indicators, touch panel, buttons, etc.

As indicated schematically according to an exemplary embodiment in FIGS. 9A-9D, 10A-10C, 11, 12, 13, 14A-14D, 15A-15C, 16A-16C, 17A-17C, 18A-18C, 19A-19D, 20A-20D, 21A-21C, 22, 23, 24, 25, 26, 27, 28, 29, 30, 31, 32, 33, 35, 36, 37 and 38, component C with composite structure comprising base B/SB may comprise a cover structure TS with cover base TB and cover layer TL such as a panel; cover base TB may provide a core CR; cover base TB may provide a perimeter PM; the panel may be within an aperture AP in the cover base; the panel may comprise the user interface with an input device and/or an output device; the cover layer may comprise a flexible panel comprising the input device, a flexible structure, a deformable structure, a deformable panel comprising the input device, etc.

As indicated schematically according to an exemplary embodiment in FIGS. 9A-9D, 10A-10C, 11, 12, 13, 14A-14D, 15A-15C, 16A-16C, 17A-17C, 18A-18C, 19A-19D, 20A-20D, 21A-21C, 22, 23, 24, 25, 26, 27, 28, 29, 30, 31, 32, 33, 35, 36, 37 and 38, component C with composite structure comprising base B/SB may comprise a cover structure TS with a functional module FM comprising a sensor arrangement SN or a lighting system with lighting LED arrangement for the user interface system UIS. See also FIGS. 2, 3 and 14A-14C. As indicated schematically in FIGS. 31, 32, 33 and 38, the cover structure may comprise a light-transmissive material and an opaque material configured to provide an illumination effect.

As indicated schematically according to an exemplary embodiment in FIGS. 9A-9D, 10A-10C, 11, 12, 13, 14A-14D, 15A-15C, 16A-16C, 17A-17C, 18A-18C, 19A-19D, 20A-20D, 21A-21C, 22, 23, 24, 25, 26, 27, 28, 29, 30, 31, 32, 33, 35, 36, 37 and 38, the composite structure may configured to provide a wide variety of visual effects; the visual effect may comprise a decorative effect of the decorative layer DL; the visual effect may comprise an illumination effect with indicia IC and light L from a lighting system with lighting elements LED; the visual effect may comprise a decorative effect of the decorative layer and the illumination effect.

As indicated schematically according to an exemplary embodiment in FIGS. 34A-34C, 35, 36, 37 and 38, the component shown as steering wheel SW with user interface UI with input device ID and output device shown as comprising light display LD may comprise a composite structure configured to facilitate deployment of an airbag AB through an airbag door ABD formed in cover structure TS; cover structure TS of the composite structure may comprise a recess RS configured to facilitate formation of the airbag door in the cover structure during deployment of an airbag from an airbag module.

As indicated schematically according to an exemplary embodiment in FIGS. 39A-39B, 40, 41A-41B, 42A-42C and 43A-43C, the component with composite structure comprising cover structure with cover base and cover layer may be formed in a variety of methods/processes into a variety of configurations and arrangements; the cover structure may comprise an integrally-formed structure such as an integrally-molded structure, a molded structure, a molded resin structure, a resin structure, a cover layer, a single-layer cover, a resin structure, etc.; the cover structure may comprise a base structure comprising the cover base.

Exemplary Embodiments—A

According to an exemplary embodiment as shown schematically in the FIGURES, a component for a vehicle interior configured to present a user interface may comprise a composite structure comprising a cover structure comprising a cover base, a cover layer and a cover surface. The cover structure may be configured to provide the user interface. The user interface may comprise an input device. The cover layer may be configured to cover at least a portion of the cover base. The cover base may comprise a core and a perimeter surrounding the core. The cover layer may extend into the cover base between the core of the cover base and the perimeter of the cover base. The cover layer may be configured to facilitate movement of the core of the cover base relative to the perimeter of the cover base. The component may comprise a gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer may extend into the aperture between the core of the cover base and the perimeter of the cover base. The cover base may comprise an aperture; the cover layer may fill the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depression; (c) an icon. The cover layer may be configured to deform as the input device is pressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. Material of the decorative layer may comprise a color different than a color of material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depression; (c) an icon. The decorative layer may be laminated on the cover layer. The decorative layer may comprise at least one of (a) a paint material; (b) an ink material. The decorative layer may comprise a depression formed by removal of a portion of the at least one of (a) the paint material; (b) the ink material. The decorative layer may comprise an opaque material; the cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The component may comprise a sensor between the light guide and the core of the cover base. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; (c) motion at the cover surface. The actuator may be coupled to the core of the cover base. The actuator may be configured to deform the cover layer between the core of the cover base and the perimeter of the cover base. The cover structure may comprise a decorative layer on the cover layer; the decorative layer may comprise an aperture configured to transmit light from the light source to present a light display. The cover layer may be configured to transmit light from a light source between the core of the cover base and the perimeter of the cover base. The input device may comprise a light guide between a light source and the core of the cover base. The component may comprise a light guide configured to transmit light from a light source to the core of the cover base. The light guide may be configured to transmit at least one of (a) a force from the actuator to the cover surface; (b) vibration from the actuator to the cover surface; (c) motion from the actuator to the cover surface. The component may comprise a sensor between the light guide and the core of the cover base. The cover structure may be configured to facilitate deployment of an airbag into the vehicle interior. The cover base may comprise a recess formed as an indentation in a rear side of the cover base; the recess may be configured to direct deployment of the airbag through the cover structure. The input device may comprise a light guide configured to transmit light from a light source to the core of the cover base. The input device may comprise at least one of a sensor and/or a switch. The input device may comprise a sensor; the sensor may comprise at least one of (a) a detector; (b) a capacitive sensor; (c) a touch sensor; (d) a mechanical switch. The input device may comprise an operator control for at least one vehicle system. The user interface may comprise the input device and an output device. The output device may comprise at least one of a light display and/or a haptics transducer. The output device may comprise a light display; the light display may comprise at least one of (a) a panel; (b) a display panel; (c) a button panel; (d) lighting; (e) a light guide; (f) LED lighting. The output device may comprise a light display; the light display may be configured to present at least one of (a) an image; (b) an icon. The light display may be configured to present a decorative effect; the decorative effect may comprise an illuminated state. The component may comprise a user interface system for the cover structure configured to present the user interface. The user interface system may comprise at least one of (a) a haptics system; (b) a haptics system comprising a transducer; (c) a haptics system comprising a transducer and an actuator; (d) an output device comprising a haptics system; (e) an output device comprising a lighted panel. The user interface system may comprise an output device comprising a haptics system comprising a transducer and an actuator; the user interface system may be actuated by the input device. The component may comprise an assembly comprising the composite structure and a functional module; the functional module may be configured to operate at least one of (a) a sensor or (b) a switch or (c) a detector or (d) a light display or (e) a display panel or (f) a control panel or (g) a transducer or (h) a haptics actuator or (i) a haptics transducer. The composite structure may comprise a base; the base may comprise a functional module; the functional module may be configured to present the user interface. The cover structure may comprise at least one of (a) an integrally-formed structure; (b) an integrally-molded structure; (c) a molded structure; (d) a molded resin structure; (e) a resin structure; (f) a cover layer; (g) a single-layer cover. The cover layer may comprise a resin structure. The cover layer may comprise a feature. The feature may comprise at least one of (a) a projection; (b) a projection at a surface of the cover layer; (c) a projection below the cover layer; (d) a rib; (e) a set of ribs; (f) an aperture; (g) an indentation; (h) an indentation and a projection; (i) a projection configured to fit within a recess in the cover base. The feature may be configured to provide the input device for the user interface. The feature may be configured to provide a decorative effect at the cover structure; the decorative effect may comprise the user interface. The cover structure may comprise a decorative layer configured to provide a decorative effect at a surface. The decorative effect may comprise at least one of (a) an image; (b) an icon. The decorative effect may comprise a set of indicators for the input device. The cover layer may comprise a panel presenting the user interface. The cover layer may comprise a panel comprising the input device and an output device. The cover layer may comprise at least one of (a) a flexible structure; (b) a deformable structure. The cover structure of the composite structure may comprise a recess configured to facilitate formation of an airbag door in the cover structure during deployment of an airbag. The input device may comprise an operator control for at least one vehicle system; the at least one vehicle system may comprise at least one of (a) a vehicle communication system; (b) vehicle entry locks; (c) an HVAC system; (d) an occupant comfort system; (e) an occupant safety system; (f) vehicle lighting; (g) a vehicle entertainment system; (h) a vehicle audio system; (i) vehicle instrumentation; (j) vehicle status information; (k) vehicle operation system; (l) mobile device connectivity; (m) network connectivity. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit; (k) a trim panel, (l) an overhead console; (m) an overhead system; (n) an operator control.

According to an exemplary embodiment as shown schematically in the FIGURES, a component for a vehicle interior configured to provide a user interface for interaction with a vehicle occupant in a vehicle providing at least one vehicle system may comprise (a) a cover structure comprising a cover surface; and (b) an input device. The cover structure may comprise a composite cover comprising a cover layer and a cover base. The cover layer may be configured to cover at least a portion of the cover base. The cover base may comprise a core and a perimeter surrounding the core. The input device may comprise the core of the cover base.

Exemplary Embodiments—B

According to an exemplary embodiment as shown schematically in the FIGURES, a component for a vehicle interior configured to present a user interface may comprise a composite structure comprising a cover structure comprising a cover base and a cover layer. The cover structure may be configured to provide the user interface. The user interface may comprise an input device. The cover structure may comprise the cover base and the cover layer and a cover surface. The cover layer may be configured to cover at least a portion of the cover base. The cover base may comprise a core and a perimeter surrounding the core. The cover layer extends into the cover base between the core of the cover base and the perimeter of the cover base. The cover layer may be configured to facilitate movement of the core of the cover base relative to the perimeter of the cover base. The component may comprise an air gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer extends into the aperture between the core of the cover base and the perimeter of the cover base. The cover base may comprise an aperture; the cover layer fills the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depression; (c) an icon. The cover layer may be configured to deform as the input device is depressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. The aperture may comprise at least one of (a) a depression; (b) an icon. The decorative layer may comprise a material different than a material of the cover layer. The material of the decorative layer may comprise a color different than a color of the material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depression; (c) an icon. The decorative layer may comprise a laminate. The decorative layer may be laminated on the cover layer. The decorative layer may comprise at least one of (a) a paint material; (b) an ink material. The decorative layer may comprise a depression formed by removal of a portion of the at least one of (a) the paint material; (b) the ink material. The decorative layer may comprise an opaque material. The cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material;

(e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The aperture may comprise at least one of (a) a depressed feature; (b) an icon. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The light guide may be configured to transmit light from the light source to the core of the cover base. The component may comprise a sensor between the light guide and the core of the cover base. The sensor may comprise at least one of (a) a capacitive touch sensor; (b) a capacitive touch film. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; and/or (c) motion at the cover surface. The cover layer may be configured to facilitate vibration of the core of the cover base. The actuator may be coupled to the core of the cover base. The actuator may be configured to deform the cover layer between the core of the cover base and the perimeter of the cover base. The user interface system may comprise a light display configured to transmit light from a light source. The cover structure may comprise a decorative layer on the cover layer; the decorative layer may comprise an aperture configured to transmit light from the light source to present the light display. The cover structure may comprise a decorative layer on the cover layer; the decorative layer may be configured to present an icon illuminated by the light source. The cover layer may be configured to transmit light from the light source between the core of the cover base and the perimeter of the cover base. The input device may comprise a light guide between the light source and the core of the cover base. The light guide may be configured to transmit light from the light source to the core of the cover base. The light guide may be coupled to the actuator. The light guide may be configured to transmit at least one of (a) a force from the actuator to the cover surface; (b) vibration from the actuator to the cover surface; and/or (c) motion from the actuator to the cover surface. The component may comprise a sensor between the light guide and the core of the cover base. The sensor may comprise at least one of (a) a capacitive touch sensor; (b) a capacitive touch film. The cover structure may be configured to facilitate deployment of an airbag into the vehicle interior. The cover base and the cover layer may be configured to break apart to facilitate deployment of the airbag into the vehicle interior. The cover base may comprise a recess formed as an indentation in the rear side of the cover base; the recess may be configured to direct deployment of the airbag through the cover structure. The cover layer may be configured to prevent visibility of the recess in the cover base. The cover structure may comprise a decorative layer on the cover layer; the decorative layer may be configured to prevent visibility of the recess in the cover base. The cover base may comprise a through hole configured to direct deployment of the airbag through the cover structure; the cover layer may be molded in the through hole. The input device may comprise a light guide configured to transmit light from a light source to the core of the cover base. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit. The user interface may comprise the input device and an output device. The input device may comprise at least one of a sensor and/or a switch. The sensor may comprise a detector. The sensor may comprise a capacitive sensor. The sensor may comprise a touch sensor. The switch may comprise a mechanical switch. The input device may comprise an operator control for at least one vehicle system. The output device may comprise at least one of a light display and/or a haptics transducer. The light display may comprise a panel. The light display may comprise a display panel. The light display may comprise a button panel. The light display may comprise lighting. Lighting may comprise LED lighting. The light display may comprise a light guide. The light display may comprise the light guide and LED lighting. The light display may be configured to present an image. The light display may be configured to present an image; the icon may comprise a set of icons. The light display may be configured to present an icon. The light display may be configured to present an icon; the icon may comprise a set of icons. The light display may be configured to present a decorative effect. The decorative effect may comprise an illuminated state and an unilluminated state. The illuminated state may comprise a set of icons. The haptics transducer may comprise a vibrating transducer. The haptics transducer may be configured to provide a tactile vibration. The component may comprise a user interface system for the cover structure configured to present the user interface. The component may comprise a functional module. The component may comprise an assembly comprising the composite structure and a functional module. The functional module may be configured to operate at least one of (a) a sensor or (b) a switch or (c) a detector or (d) a light display or (e) a display panel or (f) a control panel or (g) a transducer or (h) a haptics actuator or (i) a haptics transducer. The user interface system may be configured to provide the user interface with the functional module. The user interface system may comprise an interface with the functional module. The functional module may be coupled to vehicle systems. The functional module may be coupled to a network. The network may comprise a vehicle network. The network may comprise the internet. The network may comprise a communications network configured to provide data for the user interface. The functional module may be operated by a control module. The functional module may comprise a control module. The user interface system may comprise a haptics system. The user interface system may comprise a haptics system comprising a transducer. The user interface system may comprise a haptics system comprising a transducer and an actuator. The user interface system may comprise a haptics system comprising a transducer and an actuator; the user interface system may be actuated by the input device. The user interface system may comprise an output device comprising a haptics system. The user interface system may comprise an output device comprising a haptics system for the user interface. The user interface system may comprise an output device comprising a haptics system comprising a transducer and an actuator; the user interface system may be actuated by the input device. The user interface system may comprise an output device comprising a lighted panel. The user interface system may comprise an output device comprising a lighted panel for the user interface. The composite structure may comprise a base. The composite structure may comprise a substrate. The composite structure may comprise a panel. The cover structure may comprise a cover panel. The composite structure may comprise a base; the base may comprise a functional module; the functional module may be configured to present the user interface. The composite structure may comprise a base; the base may comprise a user interface system; the user interface system may comprise a functional module; the functional module may be configured to present the user interface. The cover structure may comprise an integrally-formed structure. The cover structure may comprise an integrally-molded structure. The cover structure may comprise a molded structure. The cover structure may comprise a molded resin structure. The cover structure may comprise a resin structure. The cover structure may comprise a cover layer. The cover structure may comprise a single-layer cover. The cover layer may comprise a resin structure. The cover structure may comprise a base structure comprising the cover base. The cover base may comprise an aperture. The cover layer may be configured to present the user interface. The cover layer may be configured to present a decorative effect. The cover layer may be configured to present a decorative effect and the user interface. The cover layer may comprise a feature. The feature may comprise a projection. The feature may comprise a projection at a surface of the cover layer. The feature may comprise a projection below the cover layer. The feature may comprise a rib. The feature may comprise a set of ribs. The feature may comprise an aperture. The feature may comprise an indentation. The feature may comprise an indentation and a projection. The feature may comprise a projection configured to fit within a recess in the cover base. The feature may be configured to provide the input device for the user interface. The feature may be configured to provide a decorative effect at the cover structure. The decorative effect of the input device may comprise the user interface. The cover structure may comprise a decorative layer. The cover structure may comprise a decorative layer on the cover layer. The cover structure may comprise a decorative layer configured to provide a decorative effect at a surface. The decorative effect may comprise an image. The decorative effect may comprise an icon. The decorative effect may comprise a set of icon. The decorative effect may comprise a set of indicators. The decorative effect may comprise a set of indicators for the input device. The decorative effect may comprise a set of indicators for a touch panel for the input device. The decorative effect may comprise a set of buttons for the input device. The cover layer may comprise a panel. The cover layer may comprise a panel within an aperture in the cover base. The cover layer may comprise a panel connected to the cover base. The cover layer may comprise a panel presenting the user interface. The cover layer may comprise a panel comprising the input device. The cover layer may comprise a panel comprising the input device comprising a touch panel. The cover layer may comprise a panel comprising the input device and an output device. The cover layer may comprise a flexible panel comprising the input device. The cover layer may comprise a flexible structure. The cover layer may comprise a deformable structure. The cover layer may comprise a deformable panel comprising the input device. The cover base may comprise a functional module for the user interface system. The cover base may comprise a sensor. The cover base may comprise a sensor element. The cover base may comprise a lighting system. The cover base may comprise a lighting system comprising a light guide and an LED system. The cover layer may comprise a light-transmissive material. The cover layer may comprise a light-transmissive material and an opaque material. The cover layer may comprise a light-transmissive material and an opaque material configured to provide an illumination effect. The composite structure may comprise a decorative layer; the cover layer may comprise a light-transmissive material and an opaque material configured to provide an illumination effect. The composite structure may be configured to provide a visual effect. The visual effect may comprise a decorative effect of the decorative layer. The visual effect may comprise the illumination effect. The visual effect may comprise a decorative effect of the decorative layer and the illumination effect. The composite structure may comprise a panel. The composite structure may comprise a fiber panel. The composite structure may be configured to facilitate deployment of an airbag. The composite structure may be configured to facilitate deployment of an airbag from an airbag module. The composite structure may be configured to facilitate deployment of an airbag through an airbag door formed in the cover structure. The composite structure may be configured to facilitate formation of an airbag door in the cover structure during deployment of an airbag. The composite structure may be configured to facilitate formation of an airbag door in the cover structure during deployment of an airbag from an airbag module. The cover structure of the composite structure may comprise a recess configured to facilitate formation of an airbag door in the cover structure during deployment of an airbag from an airbag module. The input device may comprise an operator control for at least one vehicle system; the vehicle system may comprise at least one of a vehicle communication system, vehicle entry locks, an HVAC system, an occupant comfort system, an occupant safety system, vehicle lighting, a vehicle entertainment system, a vehicle audio system, vehicle instrumentation, vehicle status information, vehicle operation system, mobile device connectivity, network connectivity. The component may comprise at least one of a trim panel, an instrument panel, a door panel, a console, a floor console, an overhead console, an overhead system, an operator control, a steering wheel. The cover structure may comprise a cover surface and the input device may comprise a button. The cover structure may comprise a composite cover comprising the cover layer and the cover base. The cover layer may be configured to cover at least a portion of the cover base. The cover base may comprise a core and a perimeter surrounding the core. The input device may comprise the core of the cover base. The cover structure may comprise a cover surface. The cover structure may comprise a composite cover comprising the cover layer and the cover base. The cover layer may be configured to cover at least a portion of the cover base. The cover base may comprise a core and a perimeter surrounding the core. The input device may comprise the core of the cover base.

According to an exemplary embodiment as shown schematically in the FIGURES, a component for a vehicle interior configured to provide a user interface for interaction with a vehicle occupant in a vehicle providing at least one vehicle system may comprise (a) a cover structure comprising a cover surface; and (b) an input device comprising a button. The cover structure may comprise a composite cover comprising a cover layer and a cover base. The cover layer may be configured to cover at least a portion of the cover base. The cover base may comprise a core and a perimeter surrounding the core. The input device may comprise the core of the cover base.

Exemplary Embodiments—C

According to an exemplary embodiment as shown schematically in the FIGURES, a component C for a vehicle interior configured to provide a user interface UI for interaction with a vehicle occupant in a vehicle providing at least one vehicle system may comprise (a) a cover structure TS comprising a cover surface T; and (b) an input device ID comprising a button. The cover structure may comprise a composite cover comprising a cover layer TL and a cover base TB. The cover layer may be configured to cover at least a portion of the cover base. The cover base may comprise a core CR and a perimeter PM surrounding the core. The input device may comprise the core of the cover base. The cover layer may extend into the cover base between the core of the cover base and the perimeter of the cover base. (See projection PN of the cover layer in FIGS. 16A-16C, 17A-17C, 18A-18C, 19A-19D, 22, 23, 27, 28, 29, 30, 31, 32 and 33.) The cover layer may be configured to facilitate movement of the core of the cover base relative to the perimeter of the cover base. The component may comprise an air gap AG between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture AP surrounding the core of the cover base. The cover base may comprise an aperture AP between the core of the cover base and the perimeter of the cover base. The cover base may comprise an aperture AP configured to separate the core of the cover base and the perimeter of the cover base. The cover base may comprise an aperture AP; the cover layer may be molded in the aperture of the cover base. The cover base may comprise an aperture AP; the cover layer may extend into the aperture between the core of the cover base and the perimeter of the cover base. The cover base may comprise an aperture AP; the cover layer may fill the aperture between the core of the cover base and the perimeter of the cover base. The cover layer may comprise a first material and the cover base may comprise a second material different than the first material; the first material maybe softer than the second material. The cover layer may provide the cover surface; the cover layer may comprise a projection configured to present the input device at the cover surface. The cover layer may provide the cover surface; the cover layer may comprise at least one of (a) a raised feature; (b) a depressed feature; (c) an icon IC. The cover layer may be configured to deform as the button is depressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor SN; (b) a capacitive touch sensor; (c) a capacitive touch film. The cover base may comprise a runner RN configured to connect the core of the cover base and the perimeter of the cover base. The component may comprise a circuit board CB. The circuit board may comprise a sensor SN and/or a light source such as a light-emitting diode LED.

According to an exemplary embodiment as shown schematically in FIGS. 18A-18C and 30, the cover structure may comprise a decorative layer DL on the cover layer. The decorative layer may comprise an aperture configured to present the input device at the cover surface. The aperture may comprise at least one of (a) a depressed feature; (b) an icon IC. The decorative layer may comprise a material different than a material of the cover layer. The material of the decorative layer may comprise a color different than a color of the material of the cover layer. The aperture may be configured to present an icon IC comprising the color of the cover layer. The decorative layer may comprise an aperture configured to transmit light L from a light source shown schematically as a light-emitting diode LED to the cover surface. The aperture may not be noticeably visible (at casual observance) on the surface of the cover when not illuminated (e.g. when "dead-fronted") by the light source. The decorative layer may provide the cover surface; the decorative layer may be configured to present the input device at the cover surface. The decorative layer may provide the cover surface; the decorative layer may comprise at least one of (a) a raised feature; (b) a depressed feature; (c) an icon IC. The decorative layer may comprise a laminate. The decorative layer may be laminated on the cover layer. The decorative layer may comprise at least one of (a) a paint material; (b) an ink material. The decorative layer may comprise a depressed feature formed by removal of a portion of the at least one of (a) the paint material; (b) the ink material. The decorative layer may comprise an opaque material. The cover layer may comprise a light-transmissive material; the cover base may comprise a light-transmissive material.

According to an exemplary embodiment, the cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin.

According to an exemplary embodiment as shown schematically in FIGS. 1D and 4-7, the component may comprise a user interface system UIS configured to present the user interface at the cover surface comprising (a) a light display configured to transmit light L from a light source and (b) the input device. The user interface may not be noticeably visible (at casual observance) on the cover surface when not illuminated (e.g. when "dead-fronted") by the light source. The cover structure may comprise a decorative layer DL on the cover layer; the decorative layer may comprise an aperture configured to transmit light L from the light source to present the input device at the cover surface. The aperture may comprise at least one of (a) a depressed feature; (b) an icon IC. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light L from the light source between the core of the cover base and the perimeter of the cover base. The input device may comprise a light guide LG between the light source and the core of the cover base. The light guide may be configured to transmit light L from the light source to the core of the cover base. The component may comprise a sensor SN between the light guide and the core of the cover base. The sensor may comprise at least one of (a) a capacitive touch sensor; (b) a capacitive touch film.

Figure 32:
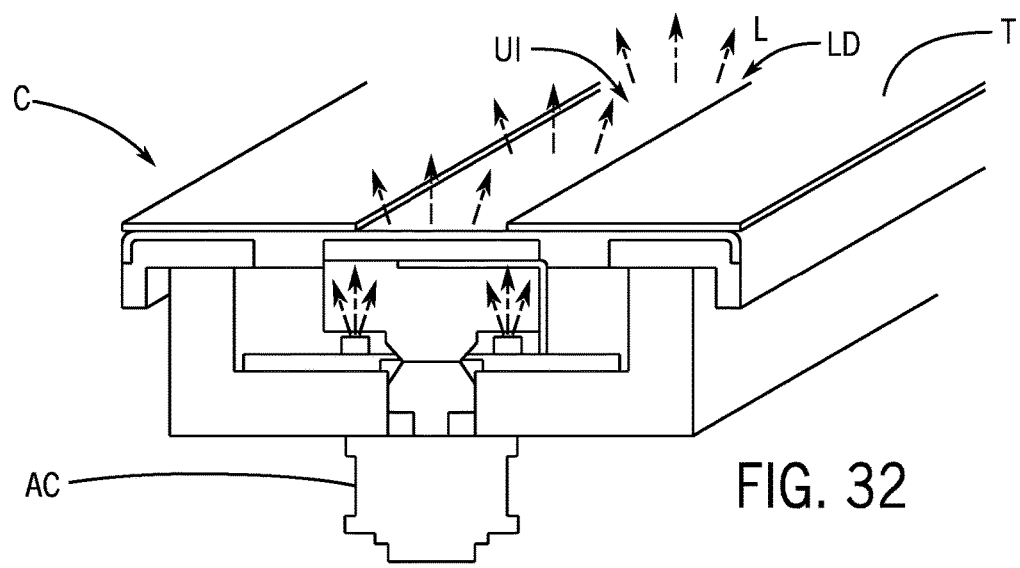
FIG. 32 is a schematic section perspective view of a component for a vehicle interior according to an exemplary embodiment.
Figure 33:
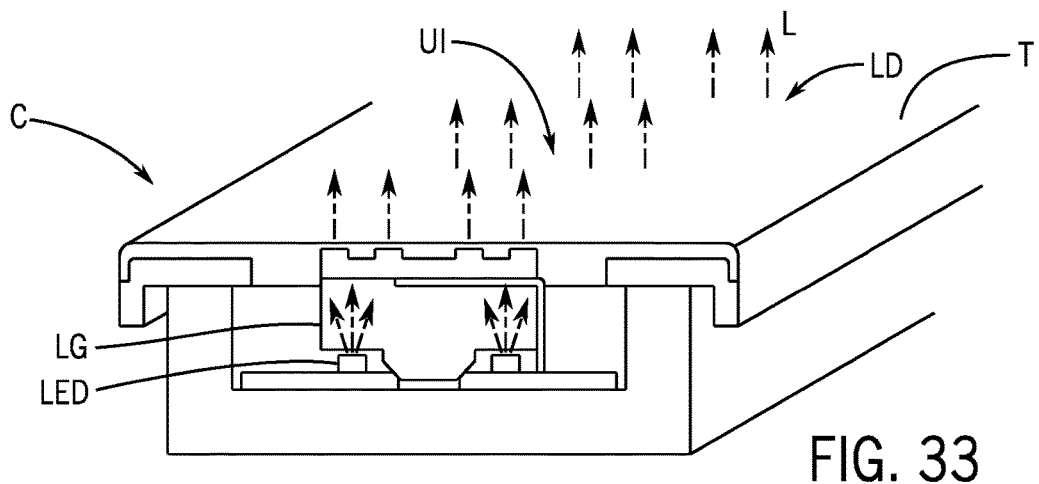
FIG. 33 is a schematic section perspective view of a component for a vehicle interior according to an exemplary embodiment.

According to an exemplary embodiment as shown schematically in FIG. 32, the component may comprise a user interface system configured to present the user interface at the cover surface comprising (a) an actuator AC configured to provide feedback at the cover surface and (b) the input device. The actuator may be configured to provide at least one of (a) a force at the cover surface; (b) vibration at the cover surface; and/or (c) motion at the cover surface. The cover layer may be configured to facilitate vibration of the core of the cover base. The actuator may be coupled to the core of the cover base. The actuator may be configured to deform the cover layer between the core of the cover base and the perimeter of the cover base. The user interface system may comprise a light display configured to transmit light L from a light source. The cover structure may comprise a decorative layer on the cover layer; the decorative layer may comprise an aperture configured to transmit light L from the light source to present the light display. The cover structure may comprise a decorative layer on the cover layer; the decorative layer may be configured to present an icon illuminated by the light source. The cover layer may be configured to transmit light L from the light source between the core of the cover base and the perimeter of the cover base. The input device may comprise a light guide LG between the light source and the core of the cover base. The light guide may be configured to transmit light L from the light source to the core of the cover base. The light guide may be coupled to the actuator. The light guide may be configured to transmit at least one of (a) a force from the actuator to the cover surface; (b) vibration from the actuator to the cover surface; and/or (c) motion from the actuator to the cover surface. The component may comprise a sensor SN between the light guide and the core of the cover base. The sensor may comprise at least one of (a) a capacitive touch sensor; (b) a capacitive touch film.

Figure 34A:
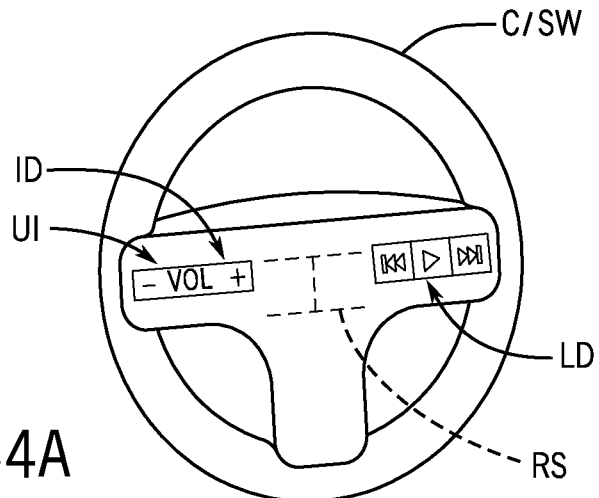
FIGS. 34A through 34C are schematic perspective views of a component for a vehicle interior according to an exemplary embodiment.
Figure 34B:
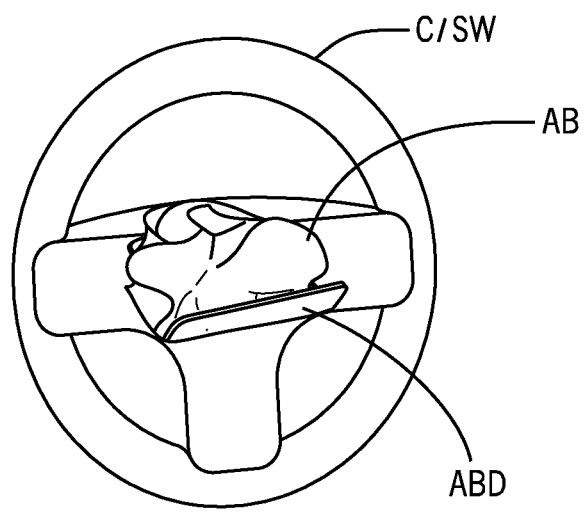
Figure 34C:
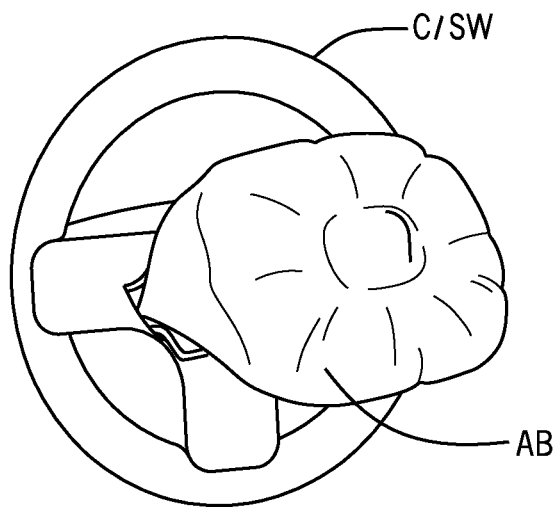
Figure 35:
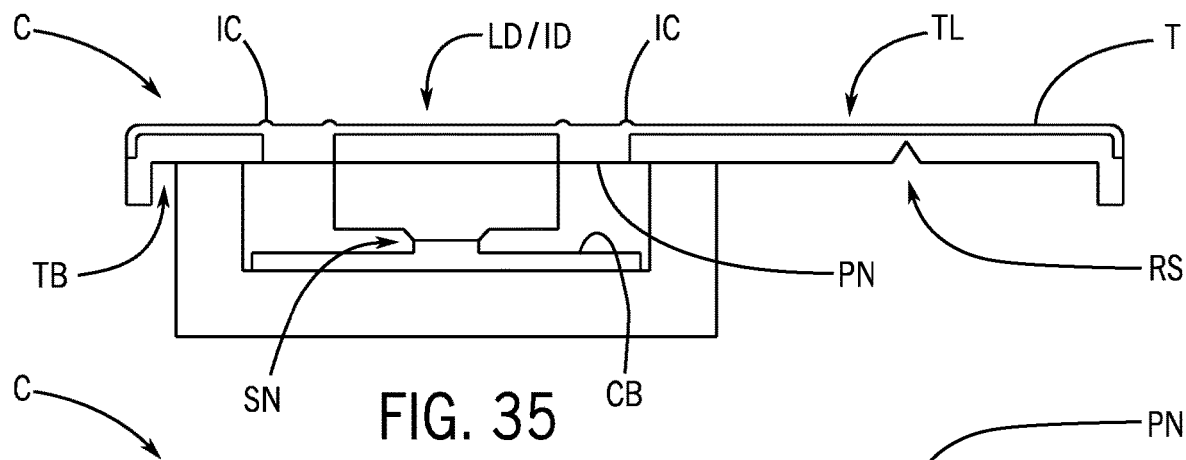
FIG. 35 is a schematic partial section view of a component for a vehicle interior according to an exemplary embodiment.
Figure 36:
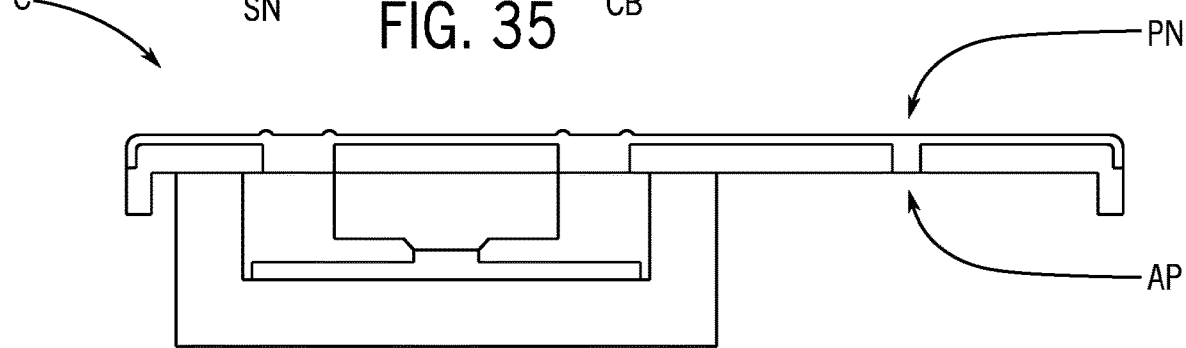
FIG. 36 is a schematic partial section view of a component for a vehicle interior according to an exemplary embodiment.
Figure 37:
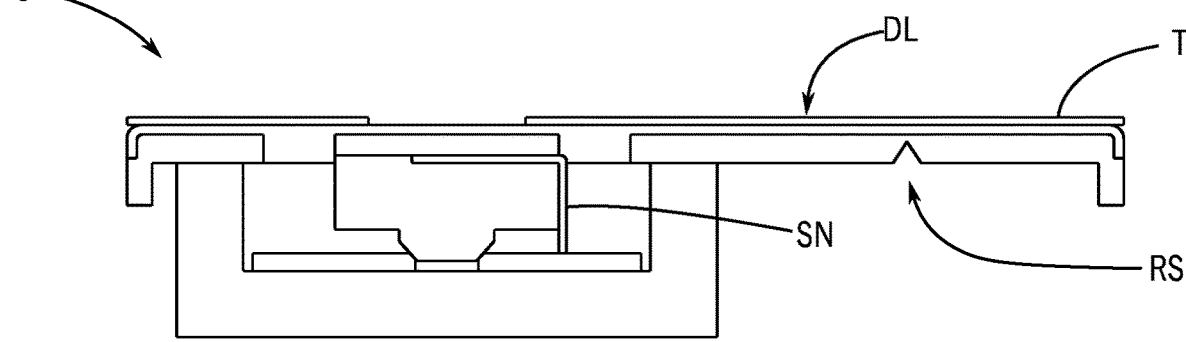
FIG. 37 is a schematic partial section view of a component for a vehicle interior according to an exemplary embodiment.
Figure 38:
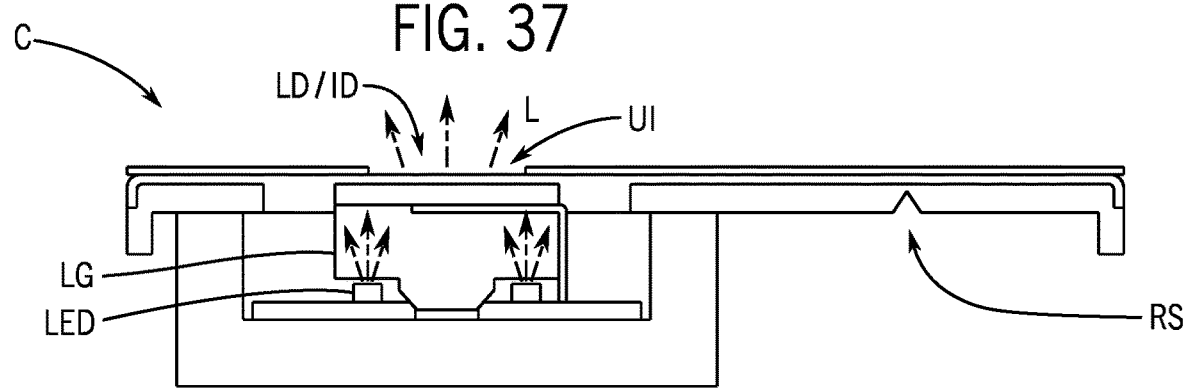
FIG. 38 is a schematic partial section view of a component for a vehicle interior according to an exemplary embodiment.
Figure 39A:
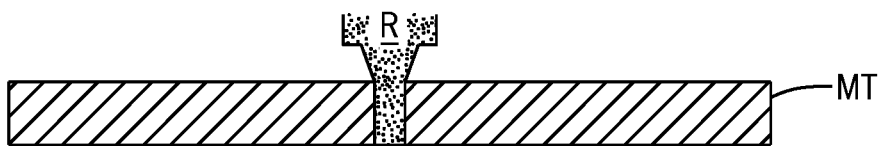
FIGS. 39A through 39F are schematic section views of a method of manufacturing a component for a vehicle interior according to an exemplary embodiment.
Figure 39B:
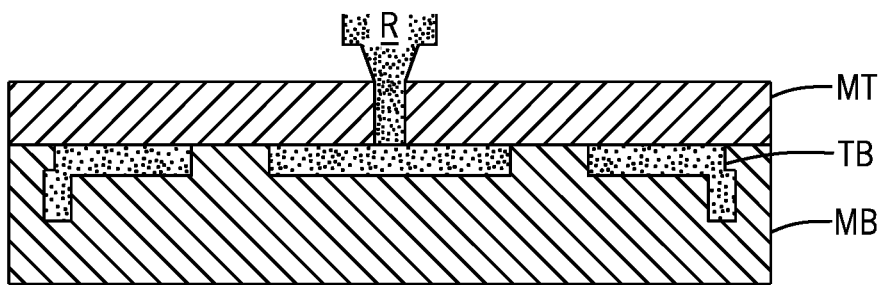
Figure 39C:
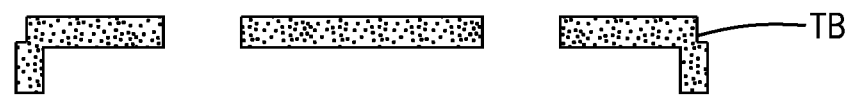
Figure 39D:
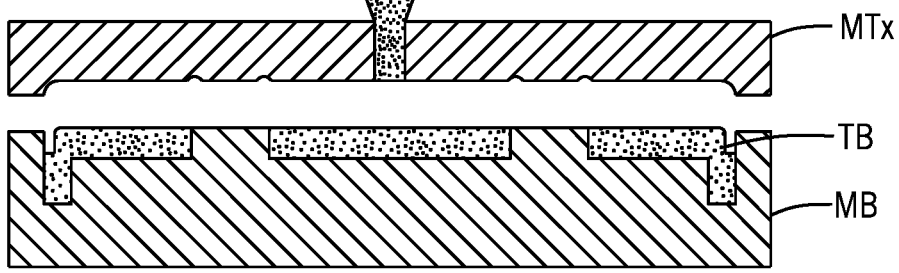
Figure 39E:
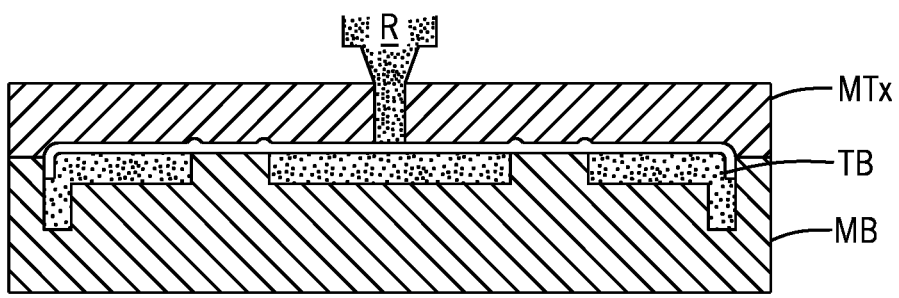
Figure 39F:
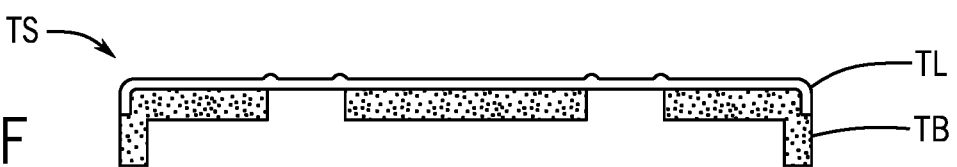

According to an exemplary embodiment as shown schematically in FIGS. 34A-34C, a component C for a vehicle interior (such as a floor console as shown schematically in FIG. 4, a steering wheel as shown schematically in FIGS. 5 and 34A-34C, a door panel as shown schematically in FIG. 6, an instrument panel as shown schematically in FIG. 1C, a trim panel, etc.) may be configured to provide/support an airbag AB configured to be deployed through an opening into the vehicle interior. As shown schematically in FIGS. 34A-34C, the component may provide a weakened shape/zone shown as a recess RS to facilitate an airbag deployment through an airbag door ABD. The weakened shape/zone may comprise an "I" shape pattern. According to an exemplary embodiment, the weakened shape/zone may comprise an "H" shape pattern, a "U" shape pattern, a "bow tie" shape pattern, or any pattern suitable for airbag deployment.

According to an exemplary embodiment as shown schematically in FIGS. 34A-34C and 35-38, the cover structure may be configured to facilitate deployment of an airbag into the vehicle interior. The cover base and the cover layer may be configured to break apart to facilitate deployment of the airbag into the vehicle interior. The cover base may comprise a recess RS formed as an indentation in the rear side of the cover base; the recess may be configured to direct deployment of the airbag through the cover structure. The cover layer may be configured to prevent visibility of the recess in the cover base. The cover structure may comprise a decorative layer DL on the cover layer; the decorative layer may be configured to prevent visibility of the recess in the cover base. The cover base may comprise a through hole (shown schematically in FIG. 36 as aperture AP) configured to direct deployment of the airbag through the cover structure; the cover layer may be molded in the through hole (shown schematically as a projection PN in FIG. 36). The input device may comprise a light guide LG configured to transmit light from a light source to the core of the cover base.

According to an exemplary embodiment, the component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit.

Figure 41A:
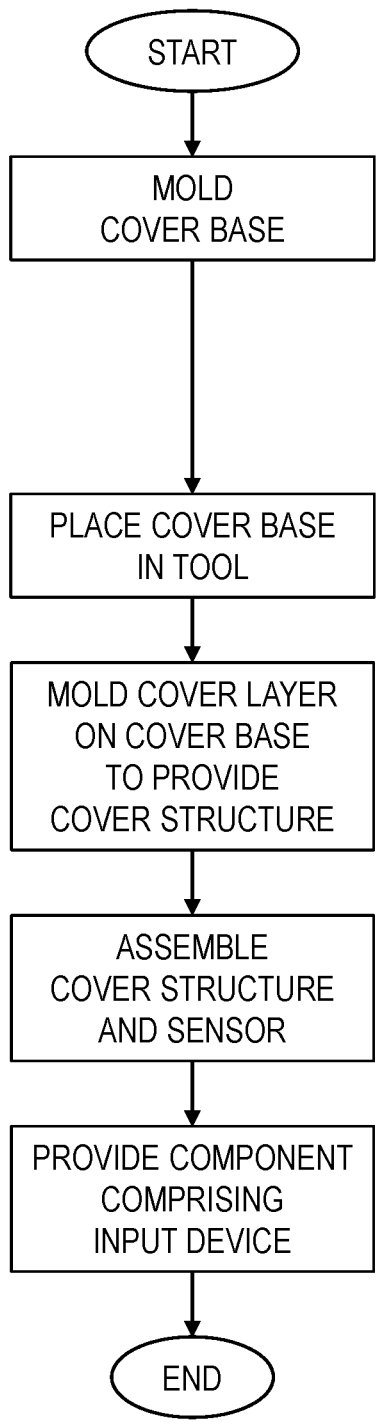
FIGS. 41A and 41B are schematic flow diagrams of methods of constructing/assembling/manufacturing a component for a vehicle interior according to an exemplary embodiment.

According to an exemplary embodiment as shown schematically in FIG. 41A, a process for producing a component for a vehicle interior may comprise molding a cover base, placing the cover base in a tool, molding a cover layer on the cover base to provide a cover structure, assembling the cover structure and a sensor, and providing the component comprising an input device.

Figure 41B:
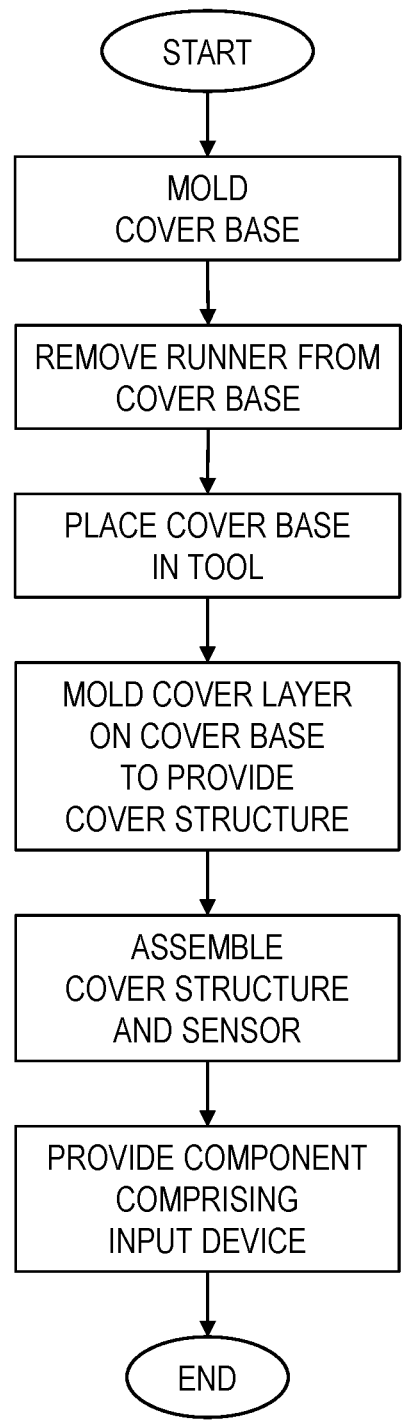

According to an exemplary embodiment as shown schematically in FIG. 41B, a process for producing a component for a vehicle interior may comprise molding a cover base, removing a runner from the cover base, placing the cover base in a tool, molding a cover layer on the cover base to provide a cover structure, assembling the cover structure and a sensor, and providing the component comprising an input device.

Figure 42A:
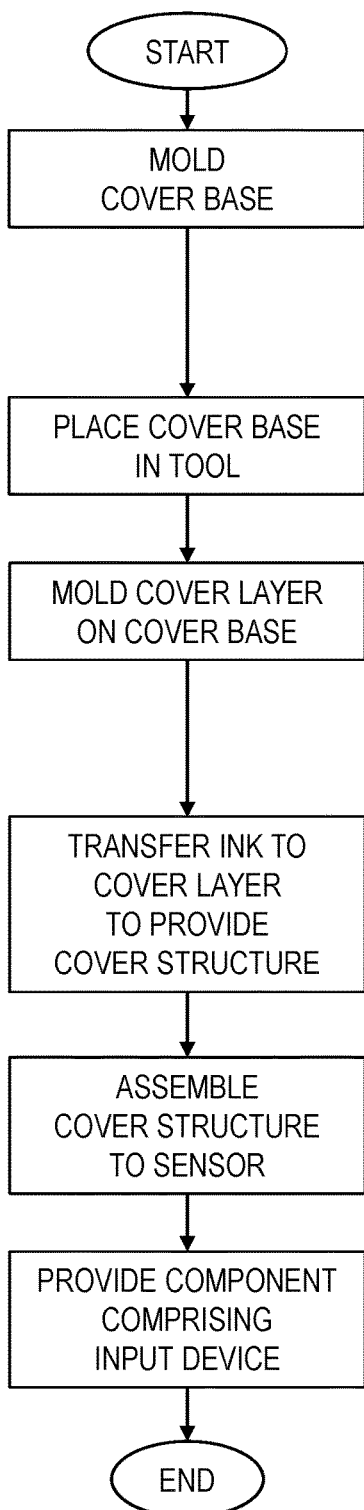
FIGS. 42A through 42C are schematic flow diagrams of methods of constructing/assembling/manufacturing a component for a vehicle interior according to an exemplary embodiment.

According to an exemplary embodiment as shown schematically in FIG. 42A, a process for producing a component for a vehicle interior may comprise molding a cover base, placing the cover base in a tool, molding a cover layer on the cover base, transferring ink to the cover layer to provide a cover structure, assembling the cover structure and a sensor, and providing the component comprising an input device.

Figure 42B:
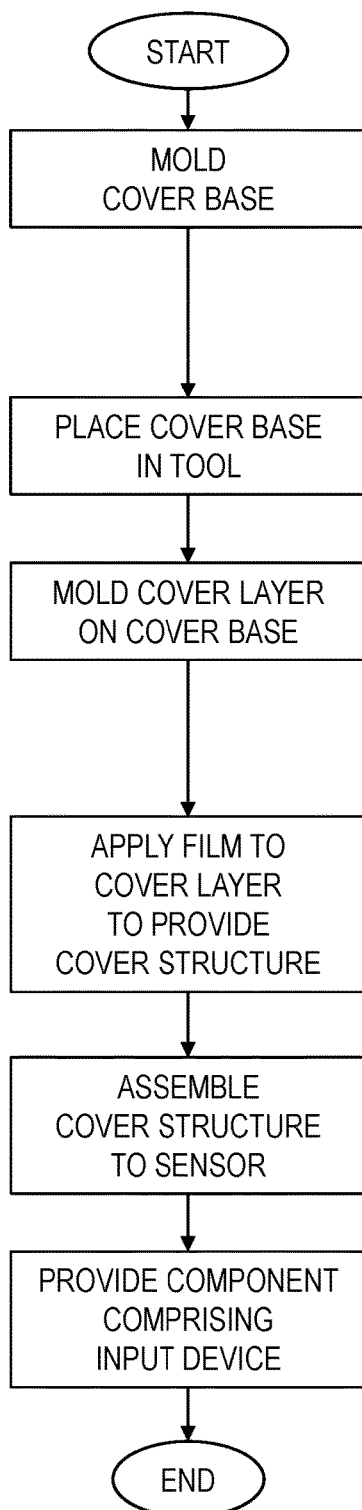

According to an exemplary embodiment as shown schematically in FIG. 42B, a process for producing a component for a vehicle interior may comprise molding a cover base, placing the cover base in a tool, molding a cover layer on the cover base, applying a film to the cover layer to provide a cover structure, assembling the cover structure and a sensor, and providing the component comprising an input device.

Figure 42C:
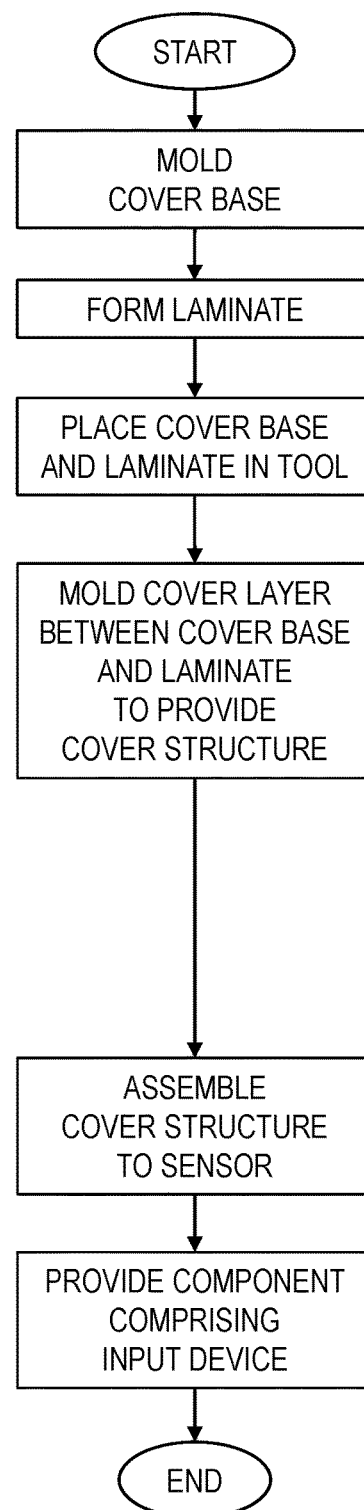

According to an exemplary embodiment as shown schematically in FIG. 42C, a process for producing a component for a vehicle interior may comprise molding a cover base, forming a laminate, placing the cover base and the laminate in a tool, molding a cover layer between the cover base and the laminate to provide a cover structure, assembling the cover structure and a sensor, and providing the component comprising an input device.

Figure 43A:
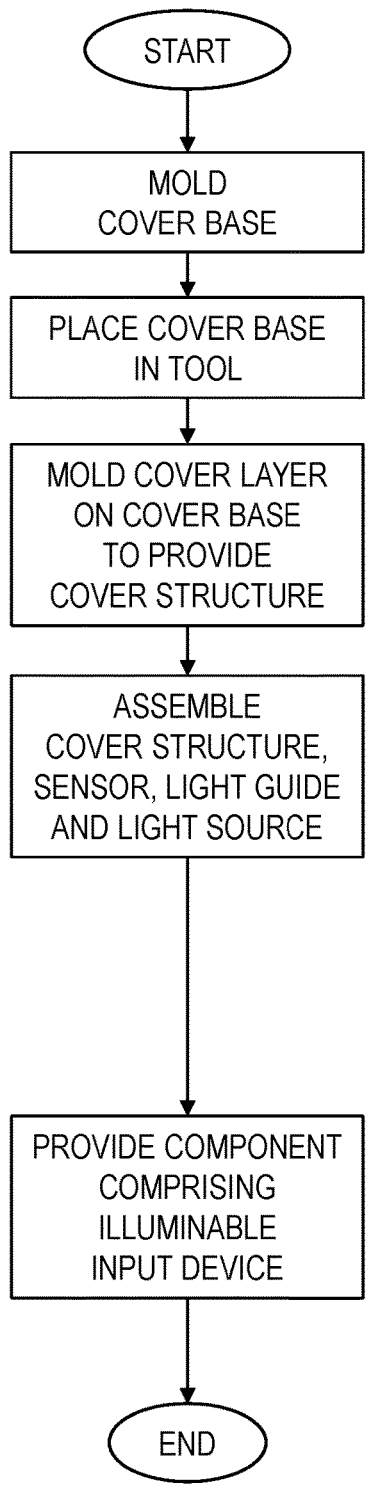
FIGS. 43A through 43C are schematic flow diagrams of methods of constructing/assembling/manufacturing a component for a vehicle interior according to an exemplary embodiment.

According to an exemplary embodiment as shown schematically in FIG. 43A, a process for producing a component for a vehicle interior may comprise molding a cover base, placing the cover base in a tool, molding a cover layer on the cover base to provide a cover structure, assembling the cover structure, a sensor, a light guide and a light source, and providing the component comprising an illuminable input device.

Figure 43B:
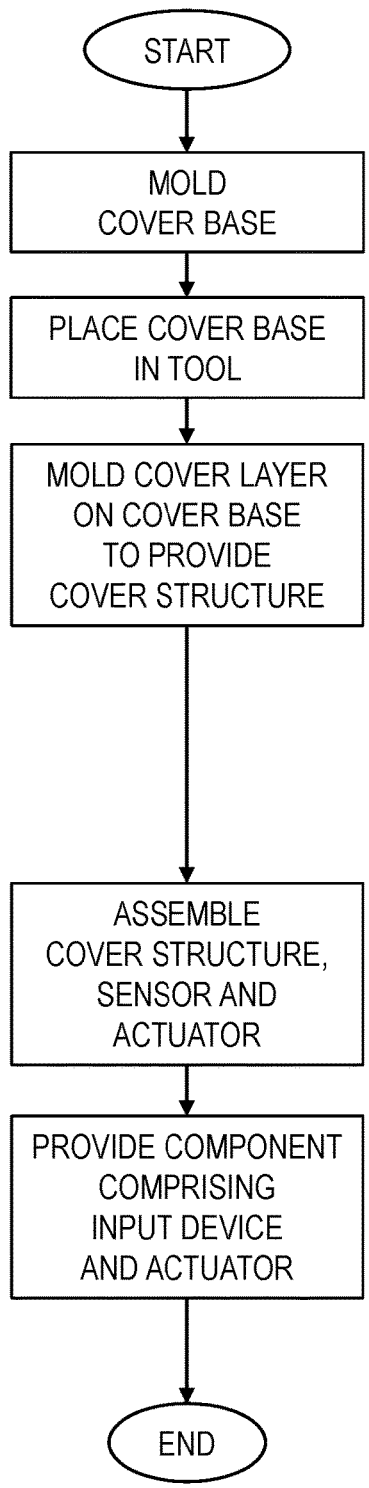

According to an exemplary embodiment as shown schematically in FIG. 43B, a process for producing a component for a vehicle interior may comprise molding a cover base, placing the cover base in a tool, molding a cover layer on the cover base to provide a cover structure, assembling the cover structure, a sensor and an actuator, and providing the component comprising an input device and an actuator.

Figure 43C:
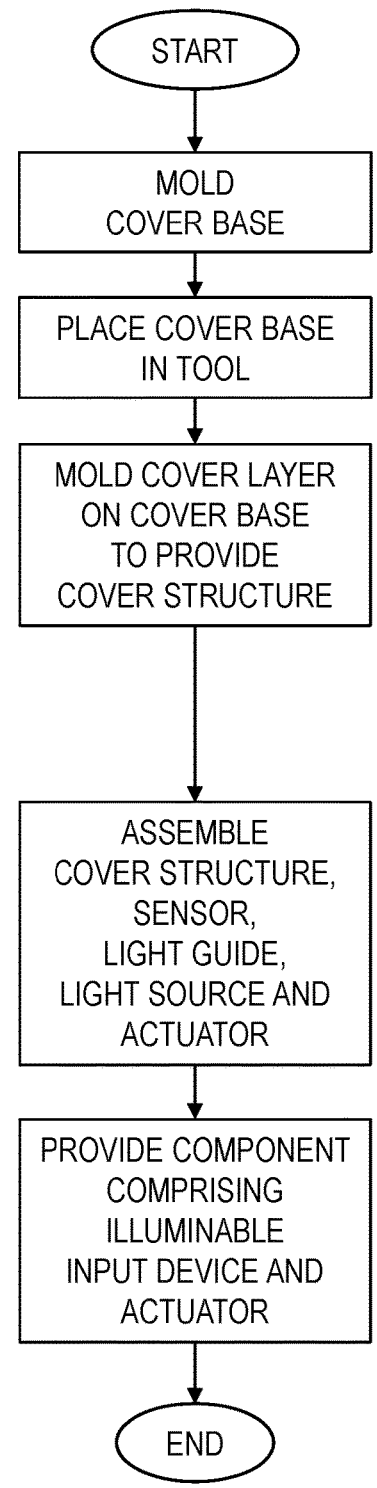

According to an exemplary embodiment as shown schematically in FIG. 43C, a process for producing a component for a vehicle interior may comprise molding a cover base, placing the cover base in a tool, molding a cover layer on the cover base to provide a cover structure, assembling the cover structure, a sensor, a light guide, a light source and an actuator, and providing the component comprising an illuminable input device and an actuator.

TABLE A

REFERENCE SYMBOL LIST

| ELEMENT, PART OR COMPONENT | REFERENCE SYMBOL |
|---|---|
| vehicle | V |
| interior | I |
| component | C |
| door panel | DP |
| steering wheel | SW |
| floor console | FC |
| instrument panel | IP |
| seat | SZ |
| overhead panel | OHP |
| armrest | AR |
| user interface system | UIS |
| user interface | UI |
| vehicle systems | VS |
| control module | MC |
| vehicle network | VN |
| network | N |
| functional module | FM |
| input device | ID |
| light display | LD |
| panel/fiber panel | FP |
| base | B |
| substrate | SB |
| cover structure | TS |
| cover base | TB |
| cover layer | TL |
| core (of the cover base) | CR |
| perimeter (of the cover base) | PM |
| aperture | AP |
| projection | PN |
| connector/runner (web/material connecting core and perimeter of cover base) | RN |
| circuit/circuit board | CB |
| cover surface | T |
| decorative layer | DL |
| icon | IC |
| Sensor | SN |
| gap/space | AG |
| LED/light emitting diode arrangement | LED |
| light | L |
| light guide | LG |
| actuator | AC |
| recess | RS |
| airbag door | ABD |
| airbag | AB |
| mold top | MT |
| mold bottom | MB |
| resin | R |
| mold top | MTx |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to present a user interface comprising:
a composite structure comprising a cover structure comprising a cover base, a cover layer and a cover surface; and
a user interface system configured to present the user interface at the cover surface comprising (a) an output device comprising a light display configured to transmit light from a light source and (b) an input device;
wherein the cover structure is configured to provide the user interface;

wherein the user interface comprises the output device and the input device;
wherein the cover layer is configured to cover at least a portion of the cover base;
wherein the cover base of the cover structure comprises a core and a perimeter;
wherein the cover layer comprises a light-transmissive material;
wherein the cover base comprises an opaque material;
wherein the cover layer is configured to transmit light from the light source between the core of the cover base and the perimeter of the cover base;
wherein the cover structure with the core and the perimeter is configured to present the output device of the user interface of the user interface system;
wherein the composite structure comprises a base structure configured to support the cover structure;
wherein the base structure comprises a functional module structure under the cover base comprising a functional module configured to present the user interface.

2. The component of claim 1 wherein the cover layer is configured to form an illuminated border around the core of the cover base.

3. The component of claim 1 wherein the cover layer is configured to deform between the core of the cover base and the perimeter of the cover base.

4. The component of claim 1 wherein the cover structure comprises an integrally-formed structure.

5. A component for a vehicle interior configured to present a user interface comprising:
   a composite structure comprising a cover structure comprising a cover base, a cover layer and a cover surface; and
   a user interface system configured to present the user interface at the cover surface comprising (a) an output device comprising an actuator configured to provide feedback at the cover surface and (b) an input device;
   wherein the cover structure is configured to provide the user interface;
   wherein the user interface comprises the output device and the input device;
   wherein the cover layer is configured to cover at least a portion of the cover base;
   wherein the cover base of the cover structure comprises a core and a perimeter;
   wherein the actuator is configured to deform the cover layer between the core of the cover base and the perimeter of the cover base;
   wherein the cover structure with the core and the perimeter is configured to present the output device of the user interface of the user interface system;
   wherein the composite structure comprises a base structure configured to support the cover structure;
   wherein the base structure comprises a functional module structure under the cover base comprising a functional module configured to present the user interface.

6. The component of claim 5 wherein the user interface system comprises a light display configured to transmit light from a light source.

7. The component of claim 5 wherein the cover layer provides the cover surface; wherein the cover layer comprises at least one of (a) a raised feature;
   (b) a depression; (c) an icon.

8. The component of claim 5 wherein the cover structure comprises an integrally-formed structure.

9. A component for a vehicle interior configured to present a user interface comprising:
   a composite structure comprising a cover structure comprising a cover base, a cover layer and a cover surface; and
   a user interface system configured to present the user interface at the cover surface comprising (a) an output device comprising an actuator configured to provide feedback at the cover surface and (b) an input device;
   wherein the cover structure is configured to provide the user interface;
   wherein the user interface comprises the output device and the input device;
   wherein the cover layer is configured to cover at least a portion of the cover base;
   wherein the cover base of the cover structure comprises a core and a perimeter;
   wherein the cover layer is configured to transmit light from a light source between the core of the cover base and the perimeter of the cover base;
   wherein the cover structure with the core and the perimeter is configured to present the output device of the user interface of the user interface system;
   wherein the composite structure comprises a base structure configured to support the cover structure;
   wherein the base structure comprises a functional module structure under the cover base comprising a functional module configured to present the user interface.

10. The component of claim 9 wherein the cover layer comprises a projection configured to fit within a recess in the cover base.

11. The component of claim 9 wherein the cover layer comprises a feature; wherein the feature is configured to provide the input device for the user interface.

12. The component of claim 9 wherein the cover layer is molded on the cover base.

13. A component for a vehicle interior configured to present a user interface comprising:
   a composite structure comprising a cover structure comprising a cover base, a cover layer and a cover surface;
   a user interface system configured to present the user interface at the cover surface comprising (a) an output device comprising an actuator configured to provide feedback at the cover surface and (b) an input device; and
   a light guide;
   wherein the cover structure is configured to provide the user interface;
   wherein the user interface comprises the output device and the input device;
   wherein the cover layer is configured to cover at least a portion of the cover base;
   wherein the cover base of the cover structure comprises a core and a perimeter;
   wherein the light guide is configured to transmit light from a light source to the core of the cover base;
   wherein the light guide is configured to transmit at least one of (a) a force from the actuator to the cover surface; (b) vibration from the actuator to the cover surface; and/or (c) motion from the actuator to the cover surface;
   wherein the cover structure with the core and the perimeter is configured to present the output device of the user interface of the user interface system;
   wherein the composite structure comprises a base structure configured to support the cover structure;
   wherein the base structure comprises a functional module structure under the cover base comprising a functional module configured to present the user interface.

14. The component of claim 13 comprising a sensor between the light guide and the core of the cover base.

15. The component of claim 14 wherein the sensor comprises at least one of (a) a capacitive sensor; (b) a touch sensor.

16. The component of claim 13 wherein the actuator is coupled to the core of the cover base.

17. A component for a vehicle interior configured to present a user interface comprising:
- a composite structure comprising a cover structure comprising a cover base, a cover layer and a cover surface; and
- a user interface system for the cover structure configured to present the user interface;
- wherein the cover structure is configured to provide the user interface;
- wherein the user interface comprises an output device and an input device;
- wherein the cover layer is configured to cover at least a portion of the cover base;
- wherein the cover base of the cover structure comprises a core and a perimeter;
- wherein the user interface system comprises the output device comprising a haptics system comprising a transducer and an actuator;
- wherein the user interface system is actuated by the input device;
- wherein the cover structure with the core and the perimeter is configured to present the output device and the input device of the user interface of the user interface system;
- wherein the composite structure comprises a base structure configured to support the cover structure;
- wherein the base structure comprises a functional module structure under the cover base comprising a functional module configured to present the user interface.

18. The component of claim 17 wherein the output device comprises a light display; wherein the light display is configured to present at least one of (a) an image; (b) an icon.

19. The component of claim 17 wherein the cover layer provides the cover surface; wherein the cover layer comprises at least one of (a) a raised feature; (b) a depression; (c) an icon.

20. The component of claim 17 wherein the cover layer comprises a feature; wherein the feature is configured to provide a decorative effect at the cover structure; wherein the decorative effect comprises the user interface.

* * * * *